United States Patent
Liu et al.

(10) Patent No.: US 11,775,803 B2
(45) Date of Patent: Oct. 3, 2023

(54) SYSTEM AND METHOD FOR ACCELERATING RNN NETWORK, AND STORAGE MEDIUM

(71) Applicant: INSPUR SUZHOU INTELLIGENT TECHNOLOGY CO., LTD., Jiangsu (CN)

(72) Inventors: Haiwei Liu, Jiangsu (CN); Gang Dong, Jiangsu (CN); Yaqian Zhao, Jiangsu (CN); Rengang Li, Jiangsu (CN); Dongdong Jiang, Jiangsu (CN); Hongbin Yang, Jiangsu (CN); Lingyan Liang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,938

(22) PCT Filed: Apr. 26, 2021

(86) PCT No.: PCT/CN2021/089936
§ 371 (c)(1),
(2) Date: Dec. 25, 2022

(87) PCT Pub. No.: WO2022/062391
PCT Pub. Date: Mar. 31, 2022

(65) Prior Publication Data
US 2023/0196068 A1    Jun. 22, 2023

(30) Foreign Application Priority Data

Sep. 25, 2020    (CN) .......................... 202011023267.4

(51) Int. Cl.
*G06F 12/10*    (2016.01)
*G06N 3/08*    (2023.01)
(Continued)

(52) U.S. Cl.
CPC ........... *G06N 3/0442* (2023.01); *G06F 17/16* (2013.01)

(58) Field of Classification Search
CPC .............................. G06N 3/0442; G06F 17/16
See application file for complete search history.

(56) References Cited

U.S. PATENT DOCUMENTS

| 11,029,958 B1* | 6/2021 | Zhang ................... G06F 9/3016 |
| 2018/0189638 A1 | 7/2018 | Nurvitadhi et al. |

(Continued)

FOREIGN PATENT DOCUMENTS

| CN | 107704916 A | 2/2018 |
| CN | 108446761 A | 8/2018 |

(Continued)

OTHER PUBLICATIONS

Gao, Chen, et al. "Survey of FPGA Based Recurrent Neural Network Accelerator." Chinese Journal of Network and Information Security. 5(4), Aug. 2019. doi: 10.11959/j.issn.2096 109x.2019034.

(Continued)

*Primary Examiner* — Brandon S Cole
(74) *Attorney, Agent, or Firm* — IPRO, PLLC

(57) ABSTRACT

A system for accelerating an RNN network including: a first cache, which is used for outputting $W_{x1}$ to $W_{xN}$ or $W_{h1}$ to $W_{hN}$ in parallel in N paths in a cyclic switching manner, and the degree of parallelism is k; a second cache, which is used for outputting $x_t$ or $h_{t-1}$ in the cyclic switching manner; a vector multiplication circuit, which is used for, by using N groups of multiplication arrays, respectively calculating $W_{x1}x_t$ to $W_{xN}x_t$, or respectively calculating $W_{h1}h_{t-1}$ to $W_{hN}h_{t-1}$; an addition circuit, which is used for calculating $W_{x1}x_t+W_{h1}h_{t-1}+b_1$ to $W_{xN}x_t+W_{hN}h_{t-1}+b_N$; an activation circuit, which is used for performing an activation operation according to an output of the addition circuit; a state (Continued)

updating circuit, which is used for acquiring $c_{t-1}$, calculating $c_t$ and $h_t$, updating $c_{t-1}$, and sending $h_t$ to the second cache; a bias data cache; a vector cache; and a cell state cache.

20 Claims, 8 Drawing Sheets

(51) Int. Cl.
  *G06N 3/0442* (2023.01)
  *G06F 17/16* (2006.01)

(56) References Cited

U.S. PATENT DOCUMENTS

| | | | |
|---|---|---|---|
| 2019/0005161 A1* | 1/2019 | Fleming | G06F 12/0895 |
| 2019/0042513 A1* | 2/2019 | Fleming, Jr. | G06F 9/30145 |
| 2019/0303153 A1* | 10/2019 | Halpern | G06F 9/4494 |
| 2020/0218965 A1 | 7/2020 | Sankaralingam et al. | |
| 2020/0310797 A1* | 10/2020 | Corbal | G06F 15/8007 |
| 2020/0310994 A1* | 10/2020 | ChoFleming | G06F 15/8007 |

FOREIGN PATENT DOCUMENTS

| | | |
|---|---|---|
| CN | 110826710 A | 2/2020 |
| CN | 111985626 A | 11/2020 |

OTHER PUBLICATIONS

He, Junhua, et al. "An LSTM acceleration engine for FPGAs based on caffe framework." 2019 IEEE 5th International Conference on Computer and Communications (ICCC). IEEE, 2019.
PCT/CN2021/089936 international search report.

* cited by examiner

SYSTEM AND METHOD FOR ACCELERATING RNN NETWORK, AND STORAGE MEDIUM

CROSS-REFERENCE TO RELATED APPLICATION

The present disclosure claims the priority of the Chinese patent application filed on Sep. 25, 2020 before the CNIPA, China National Intellectual Property Administration with the application number of 202011023267.4 and the title of "RECURRENT NEURAL NETWORK ACCELERATING SYSTEM AND METHOD, AND STORAGE MEDIUM", which is incorporated herein in its entirety by reference.

FIELD

The present disclosure relates to the technical field of neural networks, and particularly relates to a recurrent neural network accelerating system and method, and a storage medium.

BACKGROUND

Recurrent neural network (RNN) is a neural network used for processing sequential data. It is one of the most promising tools in deep learning at present, and widely applied in speech recognition, machine translation, text generation and other fields. Recurrent Neural Network solves the problem that traditional neural networks cannot share location features from data. In traditional neural network models such as convolutional neural network (CNN) and deep neural network (DNN), from an input layer to a hidden layer and then to an output layer, all layers are connected, and nodes between the layers are disconnected. Such common neural network cannot solve many problems. For example, as preceding and following words in a sentence are not independent, it is necessary to predict what the next word in a sentence will be, and it is generally necessary to use a preceding word. As the current output of a sequence is also related to preceding output, RNN is called recurrent neural network. The concrete manifestation is that the network will memorize preceding information and apply the preceding information in the calculation of the current output, that is, the nodes between hidden layers are connected instead of being disconnected, and the input of the hidden layers includes not only the output of the input layer but also the output of the hidden layer at the previous moment.

FIG. 1 is a schematic diagram showing the structure of a standard RNN. Each arrow represents a transformation, that is, the arrow connection has a weight. The left side is in the shape of being folded, the right side is in the shape of being unfolded, and an arrow next to h in the left side represents "loop" in this structure. x represents input, h represents a hidden layer unit, o represents output, L represents a loss function, and y is a label of a training set. t in the upper right corner of these elements represents a state at time t. It can be seen that the performance of decision-making units at time t is not only determined by the input at the moment, but also affected by the time before the time t. V, W and U represent weights, and the same type of weight connections has identical weights. One of the key points of the RNN is that the preceding information can be connected to the current task.

Gate recurrent unit (GRU) and long short-term memory (LSTM) networks are commonly used RNN. Long short-term memory networks can solve the problem of long dependence, and are suitable for processing and predicting important events with very long intervals and delays in time series.

FIG. 2 is a schematic diagram of an LSTM structure and a calculation formula. LSTM removes or adds the information of "Cell state" through "gate structures", so that the retention of important contents and the removal of unimportant contents are realized. A probability value between 0 and 1 is output through a sigmoid layer to describe how much of each part can pass. 0 represents "Do not allow task variables to pass", and 1 represents "Allow all variables to pass". The gate structures contained in the LSTM include an input gate $i_t$, a forget gate $f_t$, an output gate $o_t$ and a Cell gate $c_t$.

With the wide application of the RNN in speech recognition, machine translation, language modeling, sentiment analysis, text prediction and other fields, the requirements for the RNN are getting higher and higher. Therefore, in the face of increasingly complex networks with increasingly large model parameters, it is very important to adopt appropriate ways to accelerate the RNN.

SUMMARY

The present disclosure is aimed at providing a recurrent neural network accelerating system and method, and a storage medium to effectively accelerate the recurrent neural network, reduce the time consumption, and improve the operation efficiency.

To solve the problem, the present application discloses technical solutions as follow.

A recurrent neural network accelerating system, including:

a first cache, configured to circularly switch between a first state and a second state, output $W_{x1}$ to $W_{xN}$ in N paths in the first state in parallel with degrees of parallelism of k, and output $W_{h1}$ to $W_{hN}$ in N paths in the second state in parallel with degrees of parallelism of k, wherein N is a positive integer greater than or equal to 2;

a second cache, configured to circularly switch between the first state and the second state, output $x_t$ in the first state, and output $h_{t-1}$ in the second state;

a vector multiplication circuit, configured to use N groups of multiplication arrays to respectively calculate $W_{x1}x_t$ to $W_{xN}x_t$ when receiving $W_{x1}$ to $W_{xN}$ output by the first cache, and use the N groups of multiplication arrays to respectively calculate $W_{h1}h_{t-1}$ to $W_{hN}h_{t-1}$ when receiving $W_{h1}$ to $W_{hN}$ output by the first cache, wherein the vector multiplication circuit includes the N groups of multiplication arrays, each group of the multiplication arrays include k multiplication units;

an addition circuit, configured to receive $b_1$ to $b_N$ sent by a biased data cache, and use a vector cache to realize the calculation of $W_{x1}x_t+W_{h1}h_{t-1}+b_1$ to $W_{xN}x_t+W_{hN}h_{t-1}+b_N$;

an activation circuit, configured to perform activation operation according to an output of the addition circuit;

a state updating circuit, configured to obtain $c_{t-1}$ from a Cell state cache, calculate $c_t$ and $h_t$ according to the output of the activation circuit, use $c_t$ to update $c_{t-1}$ in the Cell state cache after calculating out $c_t$, and send $h_t$ to the second cache;

wherein the recurrent neural network accelerating system further includes the biased data cache; the vector cache; and the Cell state cache;

wherein $W_{x1}$ to $W_{xN}$ sequentially represent weight data matrixes of a first gate to a N-th gate, $W_{h1}$ to $W_{hN}$ sequentially represent hidden state weight data matrixes of the first gate to the N-th gate, $b_1$ to $b_N$ sequentially represent biased data of the first gate to the N-th gate, $x_t$ represents input data at time t, $h_{t-1}$ represents hidden state data at time t−1, $h_t$ represents hidden state data at time t, $c_t$ represents a Cell state at time t, and $c_{t-1}$ represents a Cell state at time t−1.

In some embodiments, the recurrent neural network is a long short-term memory network, wherein N=4, and the system includes:

the first cache, configured to circularly switch between the first state and the second state, output $W_{xi}$, $W_{xf}$, $W_{xo}$, and $W_{xc}$ in four paths in the first state in parallel with all degrees of parallelism of k, and output $W_{hi}$, $W_{hf}$, $W_{ho}$, and $W_{hc}$ in four paths in the second state in parallel with all degrees of parallelism of k;

the second cache, configured to circularly switch between the first state and the second state, output $x_t$ in the first state, and output $h_{t-1}$ in the second state;

the vector multiplication circuit, configured to use four groups of multiplication arrays to respectively calculate $W_{xi}x_t$, $W_{xf}x_t$, $W_{xo}x_t$ and $W_{xc}x_t$ when receiving $W_{xi}$, $W_{xf}$, $W_{xo}$, and $W_{xc}$ output by the first cache, and use the four groups of multiplication arrays to respectively calculate $W_{hi}h_{t-1}$, $W_{hf}h_{t-1}$, $W_{ho}h_{t-1}$, and $W_{hc}h_{t-1}$ when receiving $W_{hi}$, $W_{hf}$, $W_{ho}$, and $W_{hc}$ output by the first cache, and including the four groups of multiplication arrays, wherein each group of the multiplication arrays include k multiplication units;

the addition circuit, configured to receive $b_i$, $b_f$, $b_o$, and $b_c$ sent by the biased data cache, and use the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$, the activation circuit, configured to perform activation operation according to the output of the addition circuit, and output $i_t$, $f_t$, $o_t$, and $\tilde{c}_t$;

the state updating circuit, configured to obtain $c_{t-1}$ from the Cell state cache, calculate $c_t$ and $h_t$ according to the output of the activation circuit, use $c_t$ to update $c_{t-1}$ in the Cell state cache after calculating out $c_t$, and send $h_t$ to the second cache;

wherein $W_{xi}$, $W_{xf}$, $W_{xo}$, and $W_{xc}$ sequentially represent a weight data matrix of an input gate, a weight data matrix of a forget gate, a weight data matrix of an output gate, and a weight data matrix of a Cell gate, $W_{hi}$, $W_{hf}$, $W_{ho}$, and $W_{hc}$ sequentially represent a hidden state weight data matrix of the input gate, a hidden state weight data matrix of the forget gate, a hidden state weight data matrix of the output gate, and a hidden state weight data matrix of the Cell gate, $b_i$, $b_f$, $b_o$, and $b_c$ sequentially represent biased data of the input gate, biased data of the forget gate, biased data of the output gate, and biased data of the Cell gate, $i_t$, $f_t$, $o_t$, and $\tilde{c}_t$ sequentially represent the input gate, the forget gate, the output gate, and the Cell gate, $x_t$ represents input data at time t, $h_{t-1}$ represents hidden state data at time t−1, $h_t$ represents hidden state data at time t, $c_t$ represents the Cell state at time t, and $c_{t-1}$ represents the Cell state at time t−1.

In some embodiments, the vector multiplication circuit is in a first flow line, the addition circuit is in a second flow line, the activation circuit and the state updating circuit are in a third flow line, and the first flow line, the second flow line and the third flow line run in parallel.

In some embodiments, the first cache includes:

a first storage unit, configured to obtain a target number of $W_{xi}$, a target number of $W_{xf}$, a target number of $W_{xo}$, and a target number of $W_{xc}$ from an off-chip storage;

a second storage unit, configured to obtain a target number of $W_{hi}$, a target number of $W_{hf}$, a target number of $W_{ho}$, and a target number of $W_{hc}$ from the off-chip storage;

a first multiplexer, connected to the first storage unit and the second storage unit respectively, configured to realize the circular switching between the first state and the second state, and select the first storage unit for data output in the first state, and select the second storage unit for data output in the second state;

a first memory, a second memory, a third memory and a fourth memory, all connected to the first multiplexer through a data classifier, configured to output $W_{xi}$, $W_{xf}$, $W_{xo}$, and $W_{xc}$ sequentially in parallel with all degrees of parallelism of k when the first multiplexer is in the first state, and configured to output $W_{hi}$, $W_{hf}$, $W_{ho}$, and $W_{hc}$ sequentially in parallel with all degrees of parallelism of k when the first multiplexer is in the second state;

the data classifier;

wherein the target number is greater than k.

In some embodiments, the first storage unit and the second storage unit both adopt a first clock, the first memory, the second memory, the third memory and the fourth memory all adopt a second clock, and the first clock and the second clock are independent of each other, so that when the output rate of any one of the first memory, the second memory, the third memory and the fourth memory is lower than the input rate, unsent data is cached in the memory.

In some embodiments, the second cache includes:

a third storage unit, configured to obtain $x_t$ at odd time from the off-chip storage;

a fourth storage unit, configured to obtain $x_t$ at even time from the off-chip storage;

a second multiplexer, connected to the third storage unit and the fourth storage unit respectively, configured to realize the circular switching between the first state and the second state, select the third storage unit for data output in the first state, and select the fourth storage unit for data output in the second state;

a third multiplexer, configured to obtain $h_0$ from the off-chip storage, receive $h_t$ sent by the state updating circuit, and select $h_0$ only at the first selection, wherein $h_0$ represents hidden state data at time t=1;

a fifth storage unit, configured to obtain $h_t$ and $h_0$ at even time through the third multiplexer;

a sixth storage unit, configured to obtain $h_t$ at odd time through the third multiplexer;

a fourth multiplexer, configured to realize the circular switching between the first state and the second state, select the fifth storage unit for data output in the first state, and select the sixth storage unit for data output in the second state; and a fifth multiplexer, configured to realize the circular switching between the first state and the second state, select the second multiplexer for data output in the first state, and select the fourth multiplexer for data output in the second state.

In some embodiments, the addition circuit includes:

four groups of $\log_2$ k-level adder circuits, wherein each group of $\log_2$ k-level adder circuits are configured to sum k of input data; and a vector addition circuit, connected to outputs of the four groups of adder circuits, configured to receive $b_i$, $b_f$, $b_o$, and $b_c$ sent by the biased data cache, and use the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$ and $W_{xc}h_t+W_{hc}h_{t-1}+b_c$ according to the output of each group of the adder circuits.

In some embodiments, the activation circuit is configured to:

perform sigmoid activation operation and tanh activation operation according to the output of the addition circuit, and output $i_t$, $f_t$, $o_t$ and $\tilde{c}_t$.

In some embodiments, the state updating circuit is configured to:

obtain $c_{t-1}$ from the Cell state cache, calculate $c_t$ and $h_t$ according to the output of the activation circuit, use $c_t$ to update $c_{t-1}$ in the Cell state cache after calculating out $c_t$, and send $h_t$ to the second cache, wherein $c_t = f_t * c_{t-1} + i_t * \tilde{c}_t$; $h_t = o_t \odot \tanh(c_t)$; $\odot$ represents point multiplication.

A recurrent neural network accelerating method, being applied to the recurrent neural network accelerating system according to any one of claim 1 to claim 9, and including the following steps:

the first cache circularly switches between the first state and the second state, outputs $W_{x1}$ to $W_{xN}$ in N paths in the first state in parallel with degrees of parallelism of k, and outputs $W_{h1}$ to $W_{hN}$ in N paths in the second state in parallel with degrees of parallelism of k, wherein N is a positive integer greater than or equal to 2;

the second cache circularly switches between the first state and the second state, outputs $x_t$ in the first state, and outputs $h_{t-1}$ in the second state;

the vector multiplication circuit uses the N groups of multiplication arrays to respectively calculate $W_{x1}x_t$ to $W_{xN}x_t$ when receiving $W_{x1}$ to $W_{xN}$ output by the first cache, uses the N groups of multiplication arrays to respectively calculate $W_{h1}h_{t-1}$ to $W_{hN}h_{t-1}$ when receiving $W_{h1}$ to $W_{hN}$ output by the first cache, and the vector multiplication circuit includes the N groups of multiplication arrays, wherein each group of the multiplication arrays include k multiplication units;

the addition circuit receives $b_1$ to $b_N$ sent by the biased data cache, and uses the vector cache to realize the calculation of $W_{x1}x_t + W_{h1}h_{t-1} + b_1$ and $W_{xN}x_t + W_{hN}h_{t-1} + b_N$;

the activation circuit performs activation operation according to the output of the addition circuit;

the state updating circuit obtains $c_{t-1}$ from the Cell state cache, calculates $c_t$ and $h_t$ according to the output of the activation circuit, uses $c_t$ to update $c_{t-1}$ in the Cell state cache after calculating out $c_t$, and sends $h_t$ to the second cache;

wherein $W_{x1}$ to $W_{xN}$ sequentially represent weight data matrixes of the first gate to the N-th gate, $W_{h1}$ to $W_{hN}$ sequentially represent hidden state weight data matrixes of the first gate to the N-th gate, $b_1$ to $b_N$ sequentially represent biased data of the first gate to the N-th gate, $x_t$ represents input data at time t, $h_{t-1}$ represents hidden state data at time t−1, $h_t$ represents hidden state data at time t, $c_t$ represents a Cell state at time t, and $c_{t-1}$ represents a Cell state at time t−1.

A computer readable storage medium, storing a computer program, wherein when being executed by a processor, the computer program realizes the steps of the recurrent neural network accelerating method according to claim 10.

The technical solution provided by the embodiment of the present disclosure is applied. Considering that the calculation of the gate structures occupies most of the calculations of the whole RNN, which are mainly the calculation of matrix and vector multiplication, the present disclosure is provided with the vector multiplication circuit including the N groups of multiplication arrays, and each group of multiplication arrays includes k multiplication units, which is beneficial to increasing the calculation speed. Considering that in the traditional technical solution, $W_x x_t$ and $W_h h_{t-1}$ are combined together and calculated, and when the dimension of $x_t$ or $h_{t-1}$ is relatively large, the calculation speed will be very slow. In the technical solution of the present disclosure, $W_x x_t$ and $W_h h_{t-1}$ are calculated in time-sharing and segmentation modes, that is, it is not necessary to wait until all the values of $W_x x_t$ and $W_h h_{t-1}$ are generated before accumulating, which is beneficial to further improving the acceleration effect of the technical solution. The first cache is configured to circularly switch between the first state and the second state, output $W_{x1}$ to $W_{xN}$ in N paths in the first state in parallel with all degrees of parallelism of k, and output $W_{h1}$ to $W_{hN}$ in N paths in the second state in parallel with all degrees of parallelism of k, wherein N is a positive integer greater than or equal to 2. The second cache is configured to circularly switch between the first state and the second state, output $x_t$ in the first state, and output $h_{t-1}$ in the second state. The vector multiplication circuit is configured to use the N groups of multiplication arrays to respectively calculate $W_{x1}x_t$ to $W_{xN}x_t$ when receiving $W_{x1}$ to $W_{xN}$ output by the first cache, and use the N groups of multiplication arrays to respectively calculate $W_{h1}h_{t-1}$ to $W_{hN} h_{t-1}$ when receiving $W_{h1}$ to $W_{hN}$ output by the first cache. The addition circuit is configured to receive $b_1$ to $b_N$ sent by the biased data cache, and use the vector cache to realize the calculation of $W_{x1}x_t + W_{h1}h_{t-1} + b_1$ and $W_{xN}x_t + W_{hN}h_{t-1} + b_N$. In addition, in the technical solution of the present disclosure, each group of multiplication arrays include k multiplication units; by setting and adjusting the value of k, the technical solution of the present disclosure may adapt to RNNs of different sizes, that is, the technical solution of the present disclosure has very strong flexibility and expansibility. In summary, the technical solution of the present disclosure effectively realizes the acceleration of the RNN, and has very strong flexibility and expansibility.

BRIEF DESCRIPTION OF THE DRAWINGS

In order to more clearly illustrate the embodiments of the present application or the technical solution in the prior art, the following will be a brief introduction to the drawings that need to be used in the embodiments or prior art description. Obviously, the drawings described below are only some embodiments of the present application, for those of ordinary skill in the art, without paying creative labor, other drawings may also be obtained according to these drawings.

DETAILED DESCRIPTION OF THE EMBODIMENTS

The main purpose of the present disclosure is to provide a recurrent neural network (RNN) accelerating system, which effectively realizes the acceleration of a recurrent neural network (RNN), and has very strong flexibility and expansibility.

In order to make those skilled in the art better understand the technical solutions of the present disclosure, the present disclosure is further described in detail below with reference to the accompanying drawings and implementations. Obviously, the described embodiments are merely a part of embodiments of the present disclosure and not all the embodiments. Based on the embodiments of the present disclosure, all other embodiments obtained by a person of ordinary skilled in the art without involving any inventive effort all fall within the scope of the present disclosure.

Figure 1:
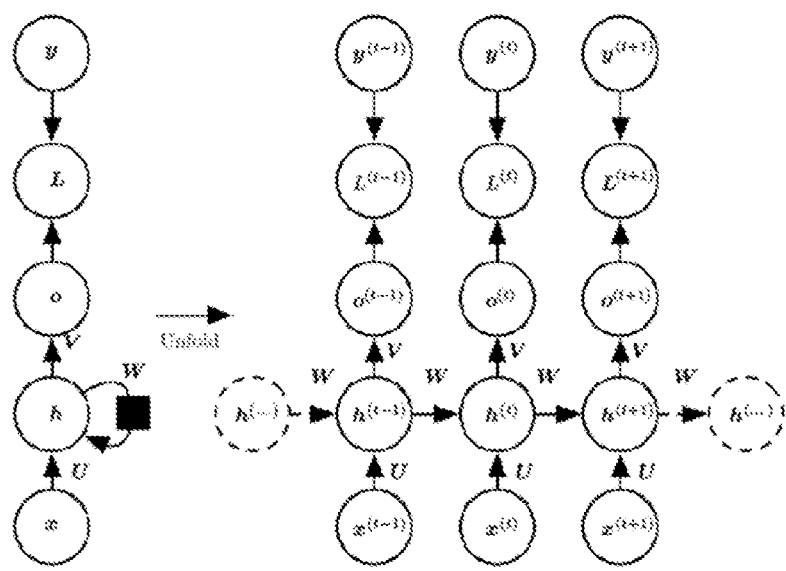
FIG. 1 is a standard structure diagram showing a recurrent neural network (RNN)
Figure 2:
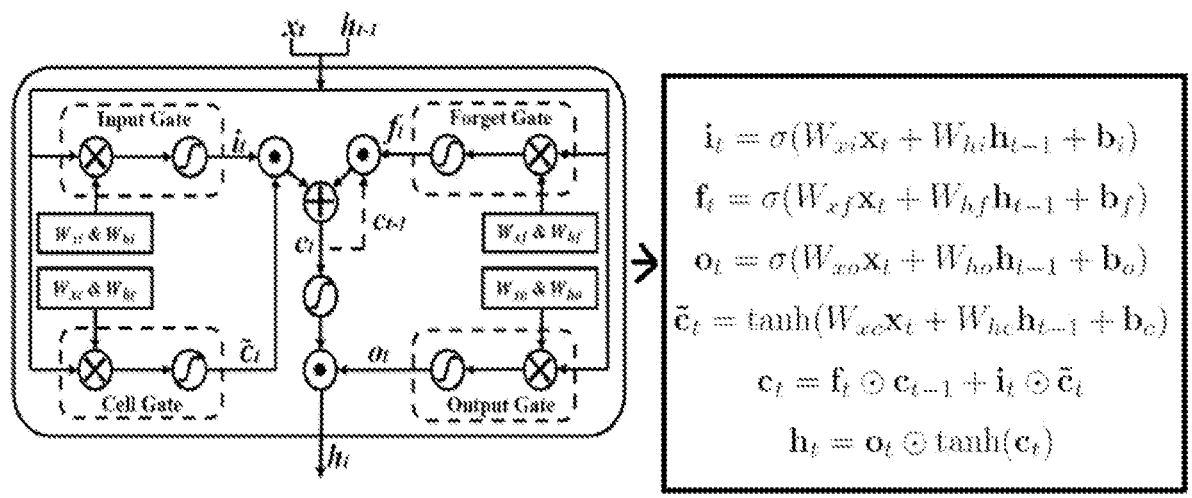
FIG. 2 is a schematic diagram showing the structure and calculation formulas of a long short-term memory (LSTM) network.
Figure 3:
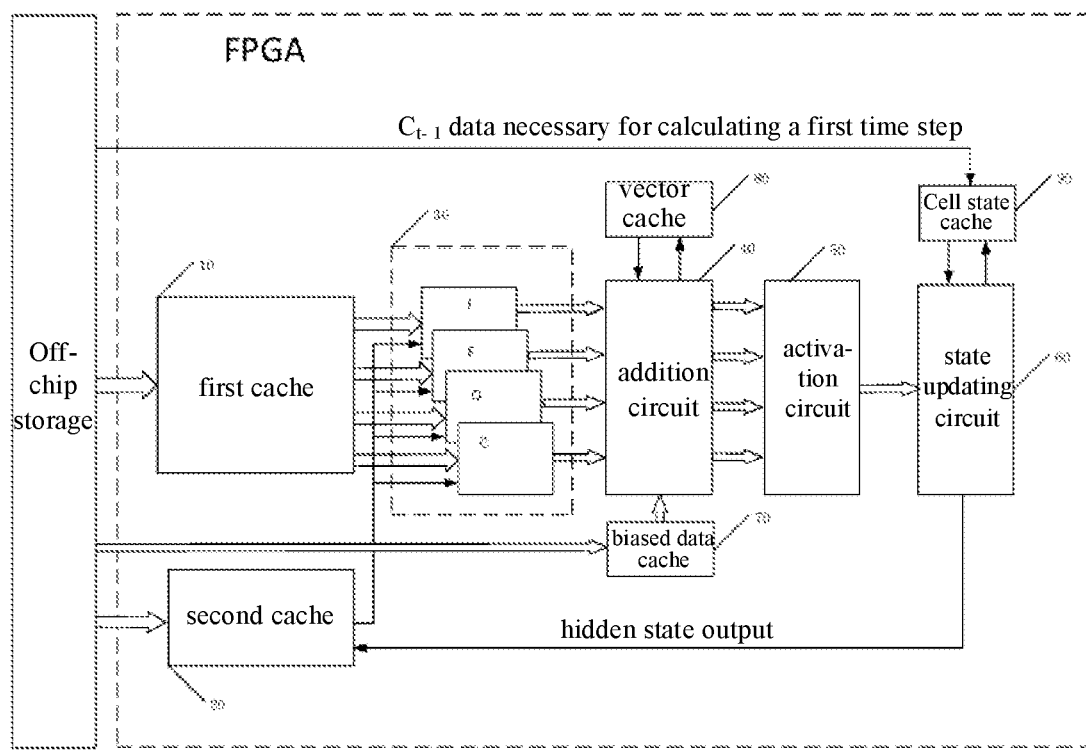
FIG. 3 is a schematic diagram showing the structure of a recurrent neural network accelerating system according to some embodiments of the present disclosure.

FIG. 3 shows a schematic structural diagram of a recurrent neural network accelerating system according to the present disclosure. The recurrent neural network accelerating system may be applied to hardware such as a field-programmable gate array (FPGA), an application specific integrated circuit (ASIC), and a reconfigurable chip. The field-programmable gate array has the advantages of strong flexibility, configurability, and low power consumption, and therefore, the following content is illustrated by taking the field-programmable gate array as an example.

The recurrent neural network accelerating system may include:

a first cache 10, configured to circularly switch between a first state and a second state, output $W_{x1}$ to $W_{xN}$ in N paths in the first state in parallel with all degrees of parallelism of k, and output $W_{h1}$ to $W_{hN}$ in N paths in the second state in parallel with all degrees of parallelism of k, wherein N is a positive integer greater than or equal to 2;

a second cache 20, configured to circularly switch between the first state and the second state, output $x_t$ in the first state, and output $h_{t-1}$ in the second state;

a vector multiplication circuit 30, configured to use N groups of multiplication arrays to respectively calculate $W_{x1}x_t$ to $W_{xN}x_t$ when receiving $W_{x1}$ to $W_{xN}$ output by the first cache 10, and use N groups of multiplication arrays to respectively calculate $W_{h1}b_{t-1}$ to $W_{hN}h_{t-1}$ when receiving $W_{h1}$ to $W_{hN}$ output by the first cache 10, and including the N groups of multiplication arrays, wherein each group of multiplication arrays include k multiplication units;

an addition circuit 40, configured to receive $b_1$ to $b_N$ sent by a biased data cache, and use a vector cache to realize the calculation of $W_{x1}x_t+W_{h1}h_{t-1}+b_1$ and $W_{xN}x_t+W_{hN}h_{t-1}+b_N$;

an activation circuit 50, configured to perform activation operation according to the output of the addition circuit;

a state updating circuit 60, configured to obtain $c_{t-1}$ from a Cell state cache, calculate $c_t$ and $h_t$ according to the output of the activation circuit, use $c_t$ to update $c_{t-1}$ in the Cell state cache after calculating out $c_t$, and send $h_t$ to the second cache;

the biased data cache 70; the vector cache 80; and the Cell state cache 90.

Wherein $W_{x1}$ to $W_{xN}$ represent weight data matrixes of a first gate to a N-th gate; $W_{h1}$ to $W_{hN}$ sequentially represent hidden state weight data matrixes of the first gate to the N-th gate in turn; $b_1$ to $b_N$ represent biased data of the first gate to the N-th gate in turn; $x_t$ represents input data at time t; $h_{t-1}$ represents hidden state data at time t−1; $h_t$ represents hidden state data at time t; $c_t$ represents a Cell state at time t, and $c_{t-1}$ represents a Cell state at time t−1.

The value of N may be set according to actual situations. For example, a gate recurrent unit (GRU) and a long short-term memory (LSTM) are commonly used RNNs. The GRU has two gate structures, that is, N=2. The LSTM has four gate structures, that is, N=4.

The RNN may be applied in speech recognition, character recognition, text translation, language modeling, sentiment analysis, text prediction and other fields. Especially the LSTM has been more and more widely applied due to excellent characteristics thereof.

In the following content of the present disclosure, the LSTM is used for illustration.

Through the RNN, input data may be calculated, and finally output results are obtained. For example, the RNN is the LSTM. When the LSTM is applied in speech recognition, input data $x_t$ at time t is input data of speech to be recognized at time t, and a speech recognition result may be output through the recognition of the LSTM. When the LSTM is applied in character recognition, input data $x_t$ at time t is image input data carrying characters to be recognized at time t, and a character recognition result may be output through the recognition of the LSTM. When the LSTM is applied in text translation, input data $x_t$ at time t is input data of texts to be translated at time t, and a translation result may be output through the recognition of the LSTM. When the LSTM is applied in sentiment analysis, input data $x_t$ at time t is input data of sentiments to be analyzed at time t, which may be speed input data, may also be text input data, and an analysis result may be output through the recognition of the LSTM.

In an embodiment shown in FIG. 3 of the present disclosure, the LSTM is used for illustration, that is, the recurrent neural network accelerating system in FIG. 3 is a long short-term memory accelerating system, and N=4; and the long short-term memory accelerating system may include:

the first cache 10, configured to circularly switch between the first state and the second state, output $W_{xi}$, $W_{xf}$, $W_{xo}$, and $W_{xc}$ in four paths in the first state in parallel with all degrees of parallelism of k, and output $W_{hi}$, $W_{hf}$, $W_{ho}$, and $W_{hc}$ in four paths in the second state in parallel with all degrees of parallelism of k;

the second cache 20, configured to circularly switch between the first state and the second state, output $x_t$ in the first state, and output $h_{t-1}$ in the second state;

the vector multiplication circuit 30, configured to use four groups of multiplication arrays to respectively calculate $W_{xi}x_t$, $W_{xf}x_t$, $W_{xo}x_t$ and $W_{xc}x_t$ when receiving $W_{xi}$, $W_{xf}$, $W_{xo}$, and $W_{xc}$ output by the first cache 10, and use the four groups of multiplication arrays to respectively calculate $W_{hi}h_{t-1}$, $W_{hf}h_{t-1}$, $W_{ho}h_{t-1}$, and $W_{hc}h_{t-1}$ when receiving $W_{hi}$, $W_{hf}$, $W_{ho}$, and $W_{hc}$ output by the first cache 10, and including the four groups of multiplication arrays, wherein each group of multiplication arrays include k multiplication units;

the addition circuit 40, configured to receive $b_i$, $b_f$, $b_o$, and $b_c$ sent by the biased data cache 70, and use the vector cache 80 to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$;

the activation circuit 50, configured to perform activation operation according to the output of the addition circuit 40, and output $i_t$, $f_t$, $o_t$, and $\tilde{c}_t$;

the state updating circuit 60, configured to obtain $c_{t-1}$ from the Cell state cache 90, calculate $c_t$ and $h_t$ according to the output of the activation circuit 50, use $c_t$ to update $c_{t-1}$ in the Cell state cache 90 after calculating out $c_t$, and send $h_t$ to the second cache 20;

the biased data cache 70; the vector cache 80; and the Cell state cache 90.

Wherein $W_{xi}$, $W_{xf}$, $W_{xo}$, and $W_{xc}$ represent the weight data matrix of the input gate, the weight data matrix of the forget gate, the weight data matrix of the output gate, and the weight data matrix of the Cell gate in turn; $W_{hi}$, $W_{hf}$, $W_{ho}$, and $W_{hc}$ represent the hidden state weight data matrix of the input gate, the hidden state weight data matrix of the forget gate, the hidden state weight data matrix of the output gate, and the hidden state weight data matrix of the Cell gate in turn; $b_i$, $b_f$, $b_o$, and $b_c$ represent biased data of the input gate, biased data of the forget gate, biased data of the output gate, and biased data of the Cell gate in turn; $i_t$, $f_t$, $o_t$, and $\tilde{c}_t$ represent the input gate, the forget gate, the output gate and the Cell gate in turn; $x_t$ represents input data at time t; $h_{t-1}$ represents hidden state data at time t−1; $h_t$ represents hidden state data at time t; $c_t$ represents the Cell state at time t, and $c_{t-1}$ represents the Cell state at time t−1.

It should be noted that in the above content, $W_{x1}$ to $W_{xN}$ are described as representing the weight data matrixes of the first gate to the N-th gate in turn, while the present disclosure is illustrated by taking the LSTM as an example, that is, N=4, which means that there are $W_{x1}$, $W_{x2}$, $W_{x3}$, and $W_{x4}$ which represent a weight data matrix of a first gate, a weight data matrix of a second gate, a weight data matrix of a third gate, and a weight data matrix of a fourth gate in turn. In the LSTM, skilled persons in the art usually refer to four gate structures as the input gate, the forget gate, the output gate, and the Cell gate. Therefore, in the technical solution of the present disclosure, $W_{x1}$, $W_{x2}$, $W_{x3}$, and $W_{x4}$ are represented by $W_{xi}$, $W_{xf}$, $W_{xo}$, and $W_{xc}$ in turn. As described above, $W_{xi}$, $W_{xf}$, $W_{xo}$, and $W_{xc}$ represent the weight data matrix of the input gate, the weight data matrix of the forget gate, the weight data matrix of the output gate, and the weight data matrix of the Cell gate in turn.

Similarly, $b_1$ to $b_N$ described above represent the biased data of the first gate to the N-th gate in turn. In the LSTM, $b_i$, $b_f$, $b_o$, and $b_c$ refer to $b_1$ to $b_4$ in turn. Similarly, $W_{h1}$ to $W_{hN}$ described above represent the hidden state weight data matrixes of the first gate to the N-th gate in turn. In the LSTM, $W_{hi}$, $W_{hf}$, $W_{ho}$, and $W_{hc}$ refer to $W_{h1}$, $W_{h2}$, $W_{h3}$, and $W_{h4}$ in turn.

In the technical solution of the present disclosure, for the LSTM, $W_x$ and $W_h$ are output through the first cache 10. For the LSTM, according to the present disclosure, $W_x$ represents $W_{xi}$, $W_{xf}$, $W_{xo}$, and $W_{xc}$, $W_h$ represents $W_{hi}$, $W_{hf}$, $W_{ho}$, and $W_{hc}$, and the same is true for the following content. The first cache 10 circularly switches between the first state and the second state, and the degree of parallelism for each output is k, so that in the technical solution of the present disclosure, calculation is performed with no need for combination of $W_x x_t$ and $W_h h_{t-1}$, and time-sharing and segmented calculation may be performed, which is beneficial to making all parts of the long short-term memory accelerating system being continuous, thus being beneficial to improving efficiency.

The structure of the first cache 10 may be set and adjusted according to actual requirements. For example, in some embodiments of the present disclosure, referring to FIG. 4, the first cache 10 includes:

a first storage unit 101, configured to obtain a target number of $W_{xi}$, a target number of $W_{xf}$, a target number of $W_{xo}$, and a target number of $W_{xc}$ from an off-chip storage;

a second storage unit 102, configured to obtain a target number of $W_{hi}$, a target number of $W_{hf}$, a target number of $W_{ho}$, and a target number of $W_{hc}$ from the off-chip storage;

a first multiplexer 103, connected to the first storage unit 101 and the second storage unit 102 respectively, configured to realize the circular switching between the first state and the second state, and select the first storage unit 101 for data output in the first state, and select the second storage unit 102 for data output in the second state;

a first memory 105, a second memory 106, a third memory 107, and a fourth memory 108, all connected to the first multiplexer 103 through a data classifier 104, configured to output $W_{xi}$, $W_{xf}$, $W_{xo}$, and $W_{xc}$ sequentially in parallel with all degrees of parallelism of k when the first multiplexer 103 is in the first state, and configured to output $W_{xi}$, $W_{xf}$, $W_{xo}$, and $W_{xc}$ sequentially in parallel with all degrees of parallelism of k when the first multiplexer 103 is in the second state; and the data classifier 104.

Wherein the target number is greater than k.

In the present embodiment, the first storage unit 101 can obtain the target number of $W_x$ from the off-chip storage, and the second storage unit 102 can obtain the target number of $W_h$ from the off-chip storage, wherein the target number is greater than k. In consideration of continuously reading a large amount of data and storing to the FPGA at one time, the communication times between the FPGA and the off-chip storage may be reduced. It may be understood that the first storage unit 101 and the second storage unit 102 may be set to have a relatively large capacity. Of course, under the condition that the capacity is allowable, for example, all data of $W_x$ occupies 2M in total, the 2M data can be stored in the first storage unit 101 at one time, that is, the target number is 2M, and afterwards, there is no need to obtain $W_x$ from the off-chip storage. In most cases, the capacity of the FPGA is limited, for example, $W_x$ occupies 2M in total, but the capacity of the first storage unit 101 is only 1M, so the target number can be set to 1M, and then data is read circularly, that is, the first 1M of 2M is read once, the last 1M of 2M is read next time, and the data is read circularly like this.

In addition, according to the present disclosure, the first storage unit 101 is configured to store $W_x$, the second storage unit 102 is configured to store $W_h$, and the two storage units form a ping-pong structure, so that the high-speed continuous output of data may be ensured.

According to the present disclosure, the switching of $W_x$ and $W_h$ is realized through the first multiplexer 103. When the first multiplexer 103 is in the first state, the first storage unit 101 is selected for data output, that is, outputting $W_x$. When the first multiplexer 103 is in the second state, the second storage unit 101 is selected for data output, that is, outputting $W_h$. In addition, when $W_x$ and $W_h$ are output, all the degrees of parallelism are k, that is, not all $W_x$ and $W_h$ in the first storage unit 101 and the second storage unit 102 are output. For example, the dimension of $W_x$ is represented as $N_h \times N_x$, the dimension of $W_h$ is represented as $N_h \times N_h$, the dimension of $x_t$ is represented as $N_x \times 1$, the dimension of the biased data B is represented as $N_h \times 1$. For example, in a scenario, the dimension of $W_x$ is 100×500, the degree of parallelism k is 10, the dimension of $W_h$ is 100×100, and the degree of parallelism k is 10. In the present scenario, for example, the first multiplexer 103 firstly selects first 10 data of the first row of $W_x$, then selects first 10 data of the first row of $W_h$, then selects 11th to 20th data of the first row of $W_x$, then selects the 11th to 20th data of the first row of $W_h$, and so on. After all the data of $W_x$ is read, $W_x$ is read from the beginning. $W_h$ is similar to $W_h$ in terms of data reading. The biased data B described in the present disclosure represents $b_i$, $b_f$, $b_o$, $b_c$.

Figure 4:
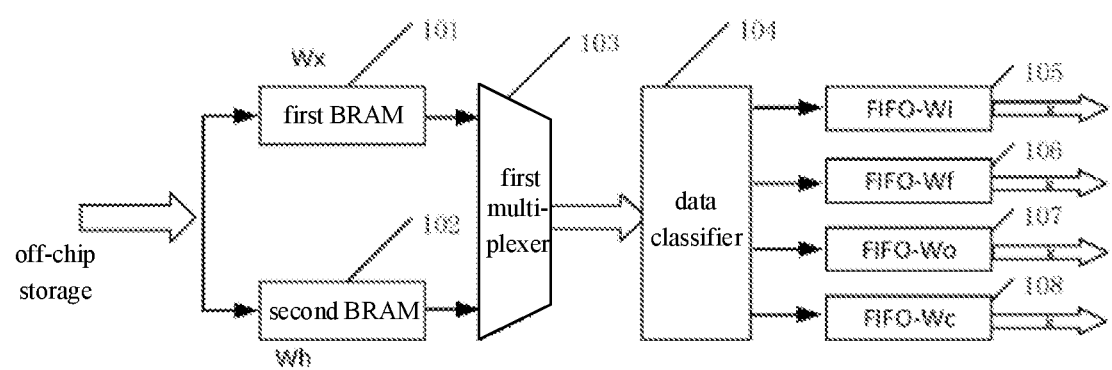
FIG. 4 is a schematic diagram showing the structure of a first cache according to the present disclosure.

According to the present disclosure, $W_x$ includes $W_{xi}$, $W_{xf}$, $W_{xo}$, and $W_{xc}$, the vector multiplication circuit 30 includes four groups of multiplication arrays, and therefore, the data classifier 104 is needed for classification, that is, $W_{xi}$, $W_{xf}$, $W_{xo}$, and $W_{xc}$ output by the first multiplexer 103 need to be transmitted to different multiplication arrays. $W_h$ is similar to $W_x$ in terms of processing manner. In an embodiment shown in FIG. 4, the first memory 105, the second memory 106, the third memory 107, and the fourth memory 108 are all first-in-first-out (FIFO) memories. FIFO-Wi105 in FIG. 4 represents the first memory 105 and is configured to output $W_{xi}$ and $W_{hi}$. Correspondingly, FIFO-Wf106, FIFO-Wo107, and FIFO-Wc108 in FIG. 4 sequentially represent the second memory 106, the third memory 107 and the fourth memory 108 and are configured to sequentially output $W_{xf}$ and $W_{hf}$, $W_{xo}$ and $W_{ho}$, $W_{xc}$ and $W_{hc}$.

The calculation of the LSTM can be expressed by the following six formulas:

Input gate $i_t = \sigma(W_{xi}x_t + W_{hi}h_{t-1} + b_i)$

Forget gate $f_t = \sigma(W_{xf}x_t + W_{hf}h_{t-1} + b_f)$

Output gate $o_t = \sigma(W_{xo}x_t + W_{ho}h_{t-1} + b_o)$

Cell gate $\tilde{c}_t = \tanh(W_{xc}x_t + W_{hc} + b_c)$

Cell state $c_t = f_t * c_{t-1} + i_t * \tilde{c}_t$

Hidden state $h_t = o_t \odot \tanh(c_t)$

It can be seen that according to the present disclosure, when the calculations of the first four formulas are performed, $W_x$ and $W_h$ are provided by the first cache 10 in a time-sharing mode, and $x_t$ and $h_{t-1}$ are provided by the second cache 20 in a time-sharing mode.

Further, according to some embodiments of the present disclosure, the first storage unit 101 and the second storage unit 102 both adopt a first clock, the first memory 105, the second memory 106, the third memory 107 and the fourth memory 108 all adopt a second clock, and the first clock and the second clock are independent of each other. Therefore, when the output rate of any one of the first memory 105, the second memory 106, the third memory 107 and the fourth memory 108 is lower than the input rate, unsent data is cached in the memory, that is, the first memory 105, the second memory 106, the third memory 107 and the fourth memory 108 play a role of caching data. Compared with an embodiment with first clocks set in a unified way, the embodiment of the present disclosure does not affect the continuous output of data by the first storage unit 101 and the second storage unit 102 under the condition that any one of the first memory 105, the second memory 106, the third memory 107, and the fourth memory 108 has a short-term data output delay, thereby being beneficial to further ensuring the acceleration effect of the technical solution of the present disclosure.

Figure 5:
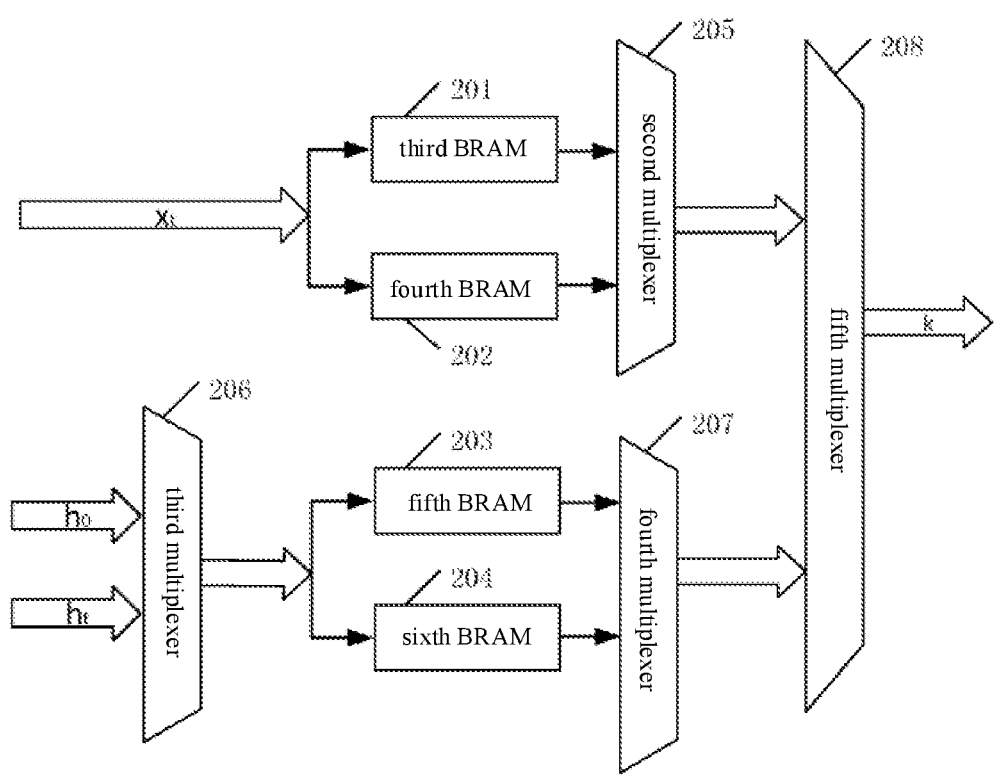
FIG. 5 is a schematic diagram showing the structure of a second cache according to some embodiments of the present disclosure.

In some embodiments of the present disclosure, referring to FIG. 5, the second cache 20 may include:

a third storage unit 201, configured to obtain $x_t$ at odd time from the off-chip storage;

a fourth storage unit 202, configured to obtain $x_t$ at even time from the off-chip storage;

a second multiplexer 205, connected to the third storage unit 201 and the fourth storage unit 202 respectively, configured to realize the circular switching between the first state and the second state, select the third storage unit 201 for data output in the first state, and select the fourth storage unit 202 for data output in the second state;

a third multiplexer 206, configured to obtain $h_0$ from the off-chip storage, receive $h_t$ sent by the state updating circuit 60, and select $h_0$ only at the first selection, wherein $h_0$ represents hidden state data at time t=1;

a fifth storage unit 203, configured to obtain $h_t$ and $h_0$ at even time through the third multiplexer 206;

a sixth storage unit 204, configured to obtain $h_t$ at odd time through the third multiplexer 206;

a fourth multiplexer 207, configured to realize the circular switching between the first state and the second state, select the fifth storage unit 203 for data output in the first state, and select the sixth storage unit 204 for data output in the second state; and a fifth multiplexer 208, configured to realize the circular switching between the first state and the second state, select the second multiplexer 205 for data output in the first state, and select the fourth multiplexer 207 for data output in the second state.

It should be noted that in the embodiments shown in FIG. 4 and FIG. 5, battery-powered random access memories (BRAM) are used as storage units, that is, in FIG. 4 and FIG. 5, the first storage unit 101, the second storage unit 102, the third storage unit 201, the fourth storage unit 202, the fifth storage unit 203 and the sixth storage unit 204 are sequentially represented as a first BRAM 101, a second BRAM 102, a third BRAM 201, a fourth BRAM 202, a fifth BRAM 203, and a sixth BRAM 204.

In an embodiment shown in FIG. 5, the third storage unit 201 is configured to obtain $x_t$ at odd time from the off-chip storage, and the fourth storage unit 202 is configured to obtain $x_t$ at even time from the off-chip storage. Considering that a single storage unit cannot realize simultaneous reading and writing operations of $x_t$, and is not beneficial to the high-speed continuous output of data, the third storage unit 201 and the fourth storage unit 202 form a ping-gong structure, which is beneficial to realizing the high-speed continuous output of data. The fifth storage unit 203 and the sixth storage unit 204 are configured in the same way as the third storage unit 201 and the fourth storage unit 202, and also form the ping-pong structure, which is beneficial to realizing the high-speed continuous output of data.

The third multiplexer 206 selects $h_0$ only at the first selection, and $h_0$ represents the hidden state data at time t=1, that is, the hidden state data $h_0$ for a first time step is from off-chip storage, and the hidden state data for other time steps is from the state updating circuit 60.

In addition, it should be pointed out that in the present embodiment, $x_t$ is divided through odd time and even time so as to be stored in the third storage unit 201 or the fourth storage unit 202; in other embodiments, other division methods may be set, which will not affect the implementation of the present disclosure; for example, in a scenario, $x_t$ at first time, second time and third time are all stored in the third storage unit 201, $x_t$ at the next three time is all stored in the fourth storage unit 202, then $x_t$ at the next three time is all stored in the third storage unit 201, and $x_t$ is circularly stored like this.

For example, in a scenario, the first multiplexer 103 first selects the first 10 data of the first row of $W_x$, and at the same time, the fifth multiplexer 208 is in the first state, that is, the fifth multiplexer 208 selects the second multiplexer 205 for data output. At the moment, the second multiplexer 205 is in the first state, that is, at the moment, the second multiplexer 205 selects the third storage unit 201 for data output. In the present scenario, the first 10 data of $x_t$ at the first time is selected, that is, the first 10 data of $x_1$ is selected. That is, at the moment, the vector multiplication circuit 30 calculates the multiplication of the first 10 data of the first row of $W_x$ and the first 10 data of $x_1$.

Then, the first multiplexer 103 selects the first 10 data of the first row of $W_h$, and at the same time, the fifth multiplexer 208 is in the second state, that is, the fifth multiplexer 208 selects the fourth multiplexer 207 for data output. At the moment, the fourth multiplexer 207 is in the first state, that is, at the moment, the fourth multiplexer 207 selects the fifth storage unit 203 for data output. In the present scenario, the first 10 data of $h_0$ is selected. That is, at the moment, the vector multiplication circuit 30 calculates the multiplication of the first 10 data of the first row of $W_h$ and the first 10 data of $h_0$.

After that, the first multiplexer 103 selects the 11th to 20th data of the first row of $W_x$, and at the same time, the fifth multiplexer 208 is in the first state, that is, the fifth multiplexer 208 selects the second multiplexer 205 for output data. At the moment, the second multiplexer 205 is still in the first state, that is, at the moment, the second multiplexer 205 selects the third storage unit 201 for data output. In the present scenario, the 11th to 20th data of $x_t$ at the first time is selected, that is, the 11th to 20th data of $x_1$ is selected. That is, at the moment, the vector multiplication circuit 30 calculates the multiplication of the 11th to 20th data of the first row of $W_x$ and the 11th to 20th data of $x_1$.

The subsequent process is similar to this until the calculation of the whole $W_x x_t$ and the calculation of the whole $W_h h_{t-1}$ are realized, which will not be repeated here.

Figure 6:
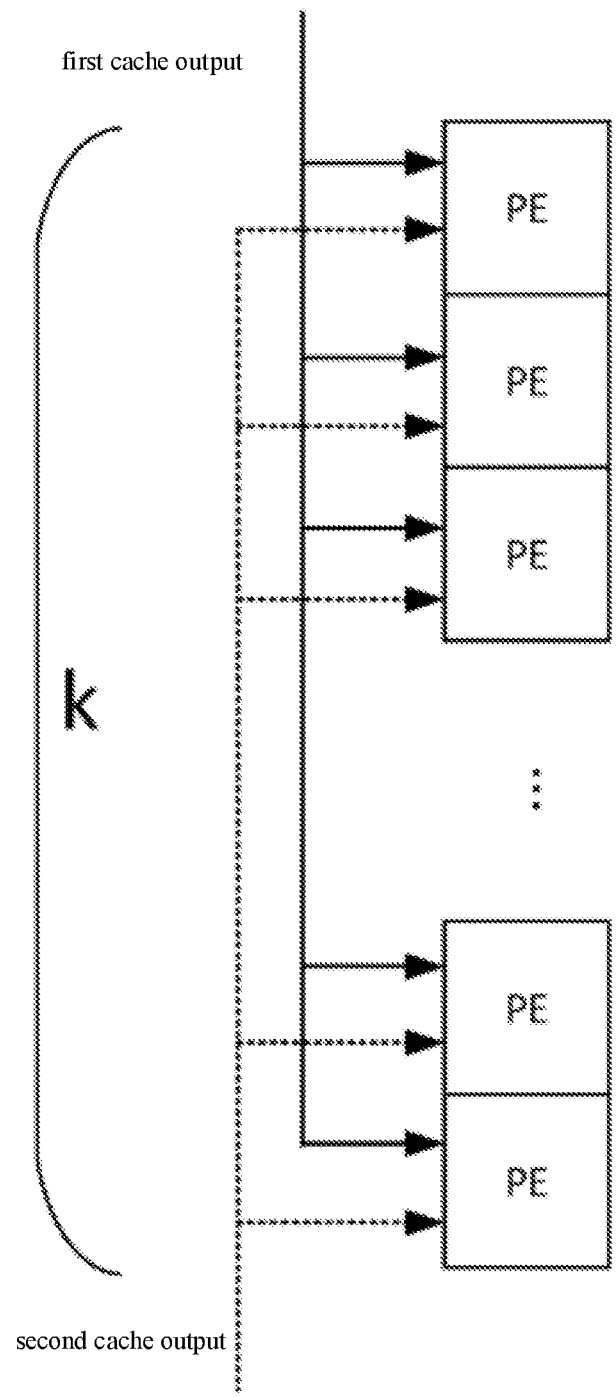
FIG. 6 is a schematic diagram showing the structure of a group of multiplication arrays according to some embodiments of the present disclosure.

The vector multiplication circuit 30 of the present disclosure includes four groups of identical multiplication arrays, and each group of multiplication arrays include k multiplication units. FIG. 6 shows a schematic structural diagram of a group of multiplication arrays. Each PE in FIG. 6 is considered to be a multiplication unit, and completes one multiplication operation. For example, in the previous embodiment, when the value of k is 10, each group of multiplication arrays include 10 PEs.

It should be noted that the dimension of $W_x$ is represented as $N_h \times N_x$, the dimension of $W_h$ is represented as $N_h \times N_h$ the dimension of $x_t$ is represented as $N_x \times 1$, and the dimension of the biased data B is represented as $N_x \times 1$. When $W_x x_t$ is calculated, the weight data $W_x$ needs to be traversed by $\lceil N_h \times N_x \div k \rceil$ times, $\lceil \ \rceil$ represents round to an integer, and $x_t$ needs to be traversed by $\lceil N_x \div k \rceil$ times. It may be understood that $x_t$ needs to be reused, and the number of repetitions is $$\left\lceil \frac{N_h \times N_x \div k}{N_x \div k} \right\rceil.$$

It is represented with a simple example, for example, $x_t$ is a vector with five rows and one column under the condition that $W_x$ is a matrix with three rows and five columns, and for example, $x_t$ is reused for 3 times under the condition that the value of k is 5. For the first time, $x_t$ is multiplied by the first row of $W_x$; for the second time, $x_t$ is multiplied by the second row of $W_x$; and for the last time, $x_t$ is multiplied by the third row of $W_x$, and thus, a vector $V_x$ with three rows and one column is obtained, which is the calculation result of the whole $W_x x_t$.

Accordingly, the process of $W_h h_{t-1}$ is the same as this, which will not be repeated here.

In addition, it may be seen that the structure of the vector multiplication circuit 30 of the present disclosure is very simple, and the vector multiplication circuit 30 can adapt to LSTMs with different sizes and structures very well according to the size and structure of the LSTM, that is, when the values of $N_h$ and $N_x$ change, only the value of k needs to be changed.

The addition circuit 40 of the present disclosure is configured to receive $b_i$, $b_f$, $b_o$ and $b_c$ sent by the biased data cache 70, and uses the vector cache 80 to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$.

As each group of multiplication arrays of the vector multiplication circuit 30 of the present disclosure output k results instead of all the results of $W_x x_t$ or $W_h h_{t-1}$, the addition circuit 40 needs the use of the vector cache 80. That is, the addition circuit 40 obtains the partial sum of matrix vector multiplication each time. In addition, the addition circuit 4 also needs to complete the addition operation in brackets in the formula $i_t=\sigma(W_{xi}x_t+W_{hi}h_{t-1}+b_i)$ of the input gate, the formula $f_t=\sigma(W_{xf}x_t+W_{hf}h_{t-1}+b_f)$ of the forget gate, the formula $o_t=\sigma(W_{xo}x_t+W_{ho}h_{t-1}+b_o)$ of the output gate, and the formula $\tilde{c}_t=\tanh(W_{xc}x_t+W_{hc}h_{t-1}+b_c)$ of the Cell gate.

Figure 7:
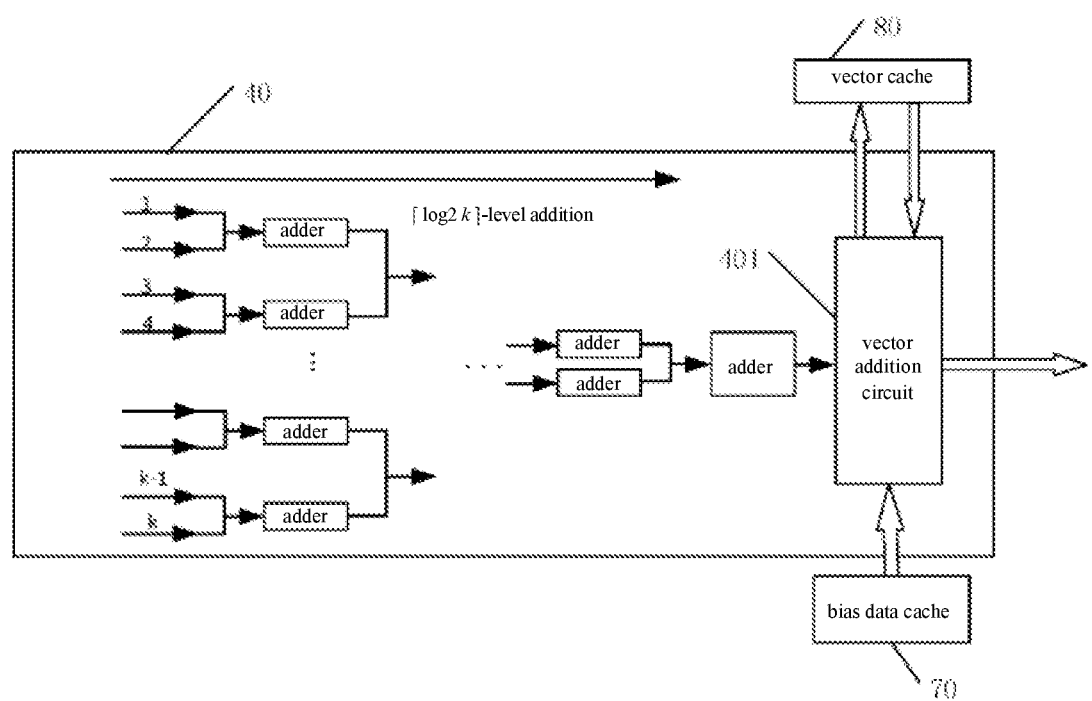
FIG. 7 is a schematic diagram showing the structure of an addition circuit according to some embodiments of the present disclosure.

In some embodiments of the present disclosure, referring to FIG. 7, the addition circuit 40 may include:

four groups of $\log_2$ k-level adder circuits, wherein each group of $\log_2$ k-level adder circuits are configured to sum k of input data; and a vector addition circuit 401, connected to the output of the four groups of adder circuits, and configured to receive $b_i$, $b_f$, $b_o$, and $b_c$ sent by the biased data cache 70, and use the vector cache 80 to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$ according to the output of each group of the adder circuits.

FIG. 7 only shows a group of $\log_2$ k-level adder circuits connected to the vector addition circuit 401. In addition, it should be noted that when examples are given in the previous embodiment, the value of k is 10, but in practical application, the value of k is usually set to an integer multiple of 2 to avoid the situation that some adders in the adder circuits are idle when the value of k is not an integer multiple of 2. Of course, the fact that the value of k is not an integer multiple of 2 does not make the technical solution unworkable.

For $W_x x_t$, for example, taking $W_{xi}x_t$ as an example, the summation of every k data output by the multiplication arrays is called one-time accumulation. After $\lceil N_x \div k \rceil$ times of accumulation, a number in the final output vector $W_{xi}x_t$ can be obtained. After $N_h \times \lceil N_x \div k \rceil$ times of accumulation, the vector $W_{xi}x_t$ with the dimension of $N_h$ can be obtained, that is, the calculation result $V_{xi}$ of the whole $W_{xi}x_t$ is obtained. The calculation of $W_{hi}h_{t-1}$ is similar to this. After $W_{xi}x_t$ and $W_{hi}h_{t-1}$ are obtained, $W_{xi}x_t$, $W_{hi}h_{t-1}$ and $b_i$ are summed, that is, the calculation of the $W_{xi}x_t+W_{hi}h_{t-1}+b_i$ is realized.

Generally, the activation circuit 50 can simultaneously activate four gate structures, that is, in some embodiments of the present disclosure, the activation circuit 50 is configured to perform a sigmoid activation operation and a tanh activation operation according to the output of the addition circuit 40, and output $i_t$, $f_t$, $o_t$ and $\tilde{c}_t$. The sigmoid activation operation represents σ symbol in the six formulas for the calculation of the LSTM, and the tanh activation operation represents a tanh symbol in the six formulas for the calculation of the LSTM.

The state updating circuit 60 can complete the calculation of $c_t=f_t*c_{t-1}+i_t*\tilde{c}_t$ and $h_t=o_t\odot\tanh(c_t)$. It should be noted that when $c_t=f_t*c_{t-1}+i_t*\tilde{c}_t$ is calculated, $c_{t-1}$ can be obtained from the Cell state cache 90, that is, in some embodiments of the present disclosure, the state updating circuit 60 is configured to: obtain $c_{t-1}$ from the Cell state cache 90, calculate $c_t$ and $h_t$ according to the output of the activation circuit 50, use $c_t$ to update $c_{t-1}$ in the Cell state cache 90 after calculating out $c_t$, and send $h_t$ to the second cache 20. $c_t=f_t*c_{t-1}+i_t*\tilde{c}_t$; $h_t=o_t\odot\tanh(c_t)$; and $\odot$ represents point multiplication.

After calculating out $c_t$, the state updating circuit 60 uses $c_t$ to update $c_{t-1}$ in the Cell state cache 90 for calculation of $c_t$ of the next time step. It should be pointed out that the Cell state of the first time step may be from the off-chip storage, that is, $c_0$ may be from off-chip storage.

In some embodiments of the present disclosure, the vector multiplication circuit 30 is in a first flow line, the addition circuit 40 is in a second flow line, the activation circuit and the state updating circuit 60 are in a third flow line, and the first flow line, the second flow line and the third flow line run in parallel.

It can be seen from the six formulas for the calculation of the LSTM that the updating of $c_t$ depends on $c_{t-1}$, the calculation of $h_t$ depends on $c_t$, and the calculation of $i_t$, $f_t$, $o_t$ and $\tilde{c}_t$ depends on $h_{t-1}$. Although the multiplication operation of matrix vectors can be accelerated through calculation with high degrees of parallelism, due to the existence of such dependence, some data can only be processed serially, which leads to break of service and is not beneficial to improving efficiency. In the present embodiment, the acceleration effect of the technical solution is further improved through the scheduling of the flow lines.

In the present embodiment, considering that the input data $x_t$ for different time steps does not have a dependency relationship, and in the technical solution of the present disclosure, $W_x x_t$ and $W_h h_{t-1}$ are calculated in time-sharing and segmentation modes, the vector multiplication circuit 30 is arranged in the first flow line, the addition circuit 40 is arranged in the second flow line, the activation circuit 50 and the state updating circuit 60 are arranged in the third flow line, and the first flow line, the second flow line and the third flow line all run in parallel. In this way, the subsequent addition operation can be started with no need for all the results of $W_h h_{t-1}$. When the activation circuit 50 and the state updating circuit 60 are running, the multiplication circuit 30 has already started the multiplication operation of the next time step, and the addition circuit 40 also sums the partial sums immediately, so that each part of the system of the present disclosure does not need to stop, that is, the aforementioned dependence is eliminated by the design of the flow lines, and the network operation efficiency of the LSTM is further improved.

Figure 8:
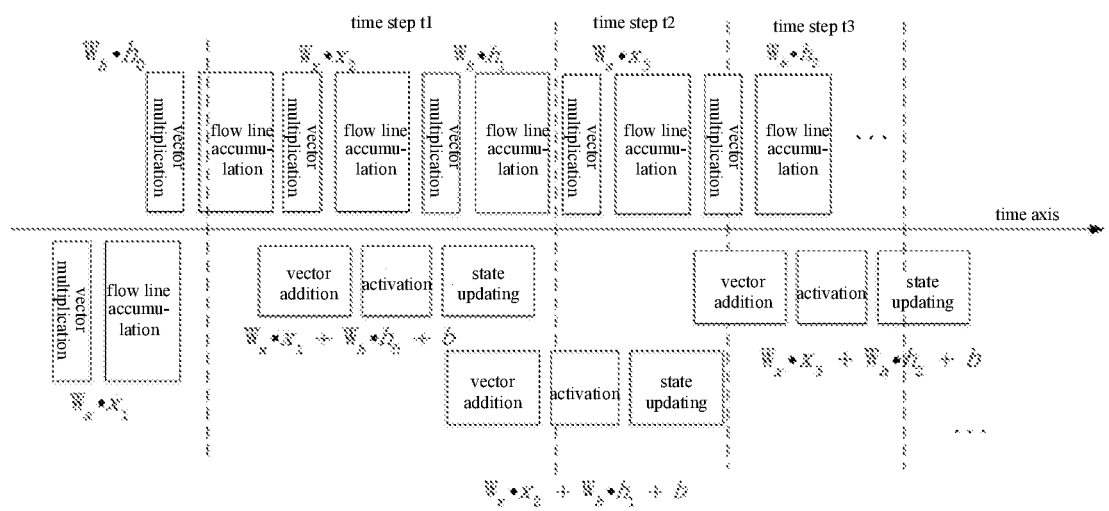
FIG. 8 is a schematic diagram showing flow line type working in some embodiments of the present disclosure.

Referring to FIG. 8 for easy understanding. When $W_x x_1$ is calculated, partial data can be accumulated at the same time with no need for obtaining all results. At the same time, $W_h h_0$ is calculated and accumulated at the same time, that is, the flow line type accumulation shown in FIG. 8 makes the multiplication circuit 30 and the addition circuit 40 be in operation at the same time. Vector addition, activation, Cell state updating and hidden state data generation which are performed in the addition circuit 40 need relatively long calculation time. In this process, the vector multiplication circuit 30 starts the operation of the next time step, that is, the operation of $W_x x_2$, followed by the operation of the $W_h h_1$, and so on, until the calculations of all time steps are completed, that is, $x_t$ at each time is calculated, and the LSTM completes the service process.

The technical solution provided by the embodiment of the present disclosure is applied. Considering that the calculation of the gate structures occupies most of the calculations of the whole RNN, which are mainly the calculation of matrix and vector multiplication, the present disclosure is provided with the vector multiplication circuit including the N groups of multiplication arrays, and each group of multiplication arrays include k multiplication units, which is beneficial to increasing the calculation speed. Considering that in the traditional technical solution, $W_x x_t$ and $W_h h_{t-1}$ are combined together and calculated, and when the dimension of $x_t$ or $h_{t-1}$ is relatively large, the calculation speed will be very slow, in the technical solution of the present disclosure, $W_x x_t$ and $W_h h_{t-1}$ are calculated in time-sharing and segmentation modes, that is, it is not necessary to wait until all the values of $W_x x_t$ and $W_h h_{t-1}$ are generated before accumulating, which is beneficial to further improving the acceleration effect of the technical solution. The first cache is configured to circularly switch between the first state and the second state, output $W_{x1}$ to $W_{xN}$ in N paths in the first state in parallel with all degrees of parallelism of k, and output $W_{h1}$ to $W_{hN}$ in N paths in the second state in parallel with all degrees of parallelism of k, wherein N is a positive integer greater than or equal to 2. The second cache is configured to circularly switch between the first state and the second state, output $x_t$ in the first state, and output $h_{t-1}$ in the second state. The vector multiplication circuit is configured to use the N groups of multiplication arrays to respectively calculate $W_{x1} x_t$ to $W_{xN} x_t$ when receiving $W_{x1}$ to $W_{xN}$ output by the first cache, and use the N groups of multiplication arrays to respectively calculate $W_{h1} h_{t-1}$ to $W_{hN} h_{t-1}$ when receiving $W_{h1}$ to $W_{hN}$ output by the first cache. The addition circuit is configured to receive $b_1$ to $b_N$ sent by the biased data cache, and use the vector cache to realize the calculation of $W_{x1} x_t + W_{h1} h_{t-1} + b_1$ to $W_{xN} x_t + W_{hN} h_{t-1} + b_N$. In addition, in the technical solution of the present disclosure, each group of multiplication arrays include k multiplication units; by setting and adjusting the value of k, the technical solution of the present disclosure can adapt to RNNs of different sizes, that is, the technical solution of the present disclosure has very strong flexibility and expansibility. In summary, the technical solution of the present disclosure effectively realizes the acceleration of the RNN, and has strong flexibility and expansibility.

Corresponding to the above system embodiment, the embodiment of the present disclosure further provides a recurrent neural network accelerating method, which may correspond to the above content for reference.

The recurrent neural network accelerating method may be applied to the recurrent neural network accelerating system in any one of the above-mentioned embodiments, and includes the following steps:

Step one, the first cache circularly switches between the first state and the second state, outputs $W_{x1}$ to $W_{xN}$ in N paths in the first state in parallel with degrees of parallelism of k, and outputs $W_{h1}$ to $W_{hN}$ in N paths in the second state in parallel with degrees of parallelism of k, wherein N is a positive integer greater than or equal to 2;

Step two, the second cache circularly switches between the first state and the second state, outputs $x_t$ in the first state, and outputs $h_{t-1}$ in the second state;

Step three, the vector multiplication circuit uses N groups of multiplication arrays to respectively calculate $W_{x1} x_t$ to $W_{xN} x_t$ when receiving $W_{x1}$ to $W_{xN}$ output by the first cache, uses the N groups of multiplication arrays to respectively calculate $W_{h1} h_{t-1}$ to $W_{hN} h_{t-1}$ when receiving $W_{h1}$ to $W_{hN}$ output by the first cache, and includes the N groups of multiplication arrays, wherein each group of multiplication arrays includes k multiplication units;

Step four, the addition circuit receives $b_1$ to $b_N$ sent by the biased data cache, and uses the vector cache to realize the calculation of $W_{x1} x_t + W_{h1} h_{t-1} + b_1$ to $W_{xN} x_t + W_{hN} h_{t-1} + b_N$;

Step five, the activation circuit performs activation operation according to the output of the addition circuit; and Step six, the state updating circuit obtains $c_{t-1}$ from the Cell state cache, calculates $c_t$ and $h_t$ according to the output of the activation circuit, uses $c_t$ to update $c_{t-1}$ in the Cell state cache after calculating out $c_t$, and sends $h_t$ to the second cache.

Wherein $W_{x1}$ to $W_{xN}$ sequentially represent weight data matrixes of the first gate to the N-th gate; $W_{h1}$ to $W_{hN}$ sequentially represent hidden state weight data matrixes of the first gate to the N-th gate; $b_1$ to $b_N$ sequentially represent biased data of the first gate to the N-th gate; $x_t$ represents input data at time t; $h_{t-1}$ represents hidden state data at time t−1; $h_t$ represents hidden state data at time t; $c_t$ represents a Cell state at time t−1; and $c_{t-1}$ represents a Cell state at time t−1.

Furthermore, in some embodiments of the present disclosure, the RNN is the LSTM, and N=4.

The step one is as follows: the first cache circularly switches between the first state and the second state, outputs $W_{xi}$, $W_{xf}$, $W_{xo}$, and $W_{xc}$ in four paths in the first state in parallel with all degrees of parallelism of k, and outputs $W_{hi}$, $W_{hf}$, $W_{ho}$, and $W_{hc}$ in four paths in the second state in parallel with all degrees of parallelism of k.

The step two is as follows: the second cache circularly switches between the first state and the second state, outputs $x_t$ in the first state, and outputs $h_{t-1}$ in the second state.

The step three is as follows: the vector multiplication circuit uses four groups of multiplication arrays to respectively calculate $W_{xi}x_t$, $W_{xf}x_t$, $W_{xo}x_t$ and $W_{xc}x_t$ when receiving $W_{xi}$, $W_{xf}$, $W_{xo}$, and $W_{xc}$ output by the first cache, and uses the four groups of multiplication arrays to respectively calculate $W_{hi}h_{t-1}$, $W_{hf}h_{t-1}$, $W_{ho}h_{t-1}$, and $W_{hc}h_{t-1}$ when receiving $W_{hi}$, $W_{hf}$, $W_{ho}$, and $W_{hc}$ output by the first cache, and includes the four groups of multiplication arrays, wherein each group of multiplication arrays include k multiplication units.

The step four is as follows: the addition circuit receives $b_i$, $b_f$, $b_o$, and $b_c$ sent by the biased data cache, and uses the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$.

The step five is as follows: the activation circuit performs activation operation according to the output of the addition circuit, and output $i_t$, $f_t$, $o_t$, and $\tilde{c}_t$.

The step six is as follows: the state updating circuit obtains $c_{t-1}$ from the Cell state cache 90, calculates $c_t$ and $h_t$ according to the output of the activation circuit, uses $c_t$ to update $c_{t-1}$ in the Cell state cache after calculating out $c_t$, and sends $h_t$ to the second cache.

Wherein $W_{xi}$, $W_{xf}$, $W_{xo}$, and $W_{xc}$ sequentially represent the weight data matrix of the input gate, the weight data matrix of the forget gate, the weight data matrix of the output gate, and the weight data matrix of the Cell gate; $W_{hi}$, $W_{hf}$, $W_{ho}$, and $W_{hc}$ sequentially represent the hidden state weight data matrix of the input gate, the hidden state weight data matrix of the forget gate, the hidden state weight data matrix of the output gate, and the hidden state weight data matrix of the Cell gate; $b_i$, $b_f$, $b_o$, and $b_c$ sequentially represent biased data of the input gate, biased data of the forget data, biased data of the output gate, and biased data of the Cell gate; $i_t$, $f_t$, $o_t$, and $\tilde{c}_t$ sequentially represent the input gate, the forget gate, the output gate and the Cell data; $x_t$ represents input data at time t; $h_{t-1}$ represents hidden state data at time t−1; $h_t$ represents hidden state data at time t; $c_t$ represents the Cell state at time t; and $c_{t-1}$ represents the Cell state at time t−1.

In some embodiments of the present disclosure, the vector multiplication circuit is in a first flow line, the addition circuit is in a second flow line, the activation circuit and the state updating circuit are in a third flow line, and the first flow line, the second flow line and the third flow line run in parallel.

In some embodiments of the present disclosure, the step one includes:

a first storage unit obtains a target number of $W_{xi}$, a target number of $W_{xf}$, a target number of $W_{xo}$, and a target number of $W_{xc}$ from an off-chip storage;

a second storage unit obtains a target number of $W_{hi}$, a target number of $W_{hf}$, a target number of $W_{ho}$, and a target number of $W_{hc}$ from the off-chip storage;

a first multiplexer respectively connected to the first storage unit and the second storage unit realizes the circular switching between the first state and the second state, and selects the first storage unit for data output in the first state, and selects the second storage unit for data output in the second state;

a first memory, a second memory, a third memory and a fourth memory are all connected to the first multiplexer through a data classifier, output $W_{xi}$, $W_{xf}$, $W_{xo}$, and $W_{xc}$ sequentially in parallel with all degrees of parallelism of k when the first multiplexer is in the first state, and output $W_{hi}$, $W_{hf}$, $W_{ho}$, and $W_{hc}$ sequentially in parallel with all degrees of parallelism of k when the first multiplexer is in the second state.

Wherein the target number is greater than k.

In some embodiments of the present disclosure, the first storage unit and the second storage unit both adopt the first clock, the first memory, the second memory, the third memory and the fourth memory all adopt the second clock, and the first clock and the second clock are independent of each other, so that when the output rate of any one of the first memory, the second memory, the third memory and the fourth memory is lower than the input rate, unsent data is cached in the memory.

In some embodiments of the present disclosure, the step two includes:

a third storage unit obtains $x_t$ at odd time from the off-chip storage;

a fourth storage unit obtains $x_t$ at even time from the off-chip storage;

a second multiplexer respectively connected to the third storage unit and the fourth storage unit realizes the circular switching between the first state and the second state, selects the third storage unit for data output in the first state, and selects the fourth storage unit for data output in the second state;

a third multiplexer obtains $h_0$ from the off-chip storage, receives $h_t$ sent by the state updating circuit, and selects $h_0$ only at the first selection, wherein $h_0$ represents hidden state data at time t=1;

a fifth storage unit obtains $h_t$ and $h_0$ at even time through the third multiplexer;

a sixth storage unit obtain $h_t$ at odd time through the third multiplexer;

a fourth multiplexer realizes the circular switching between the first state and the second state, selects the fifth storage unit for data output in the first state, and selects the sixth storage unit for data output in the second state; and a fifth multiplexer realizes the circular switching between the first state and the second state, selects the second multiplexer for data output in the first state, and selects the fourth multiplexer for data output in the second state.

In some embodiments of the present disclosure, the step four includes:

each of four groups of $\log_2$ k-level adder circuits sum k of input data; and a vector addition circuit connected to outputs of the four groups of adder circuits receives $b_i$, $b_f$, $b_o$, and $b_c$ sent by the biased data cache, and uses the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$ according to the output of each group of the adder circuits.

In some embodiments of the present disclosure, the step fifth includes:

the activation circuit performs sigmoid activation operation and tanh activation operation according to the output of the addition circuit, and outputs $i_t$, $f_t$, $o_f$ and $\tilde{c}_t$.

In some embodiments of the present disclosure, the step sixth includes:

the state updating circuit obtains $c_{t-1}$ from the Cell state cache, calculates $c_t$ and $h_t$ according to the output of the activation circuit, uses $c_t$ to update $c_{t-1}$ in the Cell state cache after calculating out $c_t$, and sends $h_t$ to the second cache. $c_t=f_t*c_{t-1}+i_t*\tilde{c}_t$; $h_t=o_t\odot \tanh(c_t)$; $\odot$ represents point multiplication.

Corresponding to the above method and system embodiments, the embodiment of the present disclosure also provides a computer readable storage medium on which a computer program is stored. When being executed by a processor, the computer program realizes the steps of the long short-term memory network accelerating method in any one of the above embodiments, which may correspond to the above content for reference. The computer readable storage medium mentioned here includes a random access memory (RAM), an internal memory, a read only memory (ROM), an electrically programmable ROM, an electrically erasable programmable ROM, a register, a hard disk, a mobile magnetic disk, a CD-ROM, or a well-known storage medium any other forms in the technical field.

It should also be noted that in this specification, relational terms such as first and second are only used to distinguish one entity or operation from another, and do not necessarily require or imply any such actual relationship or order between these entities or operations. Further, the term "including", "comprising" or any other variation thereof is intended to cover non-exclusive inclusions so that a process, method, article or apparatus comprising a series of elements includes not only those elements, but also other elements not expressly listed, or elements inherent in such process, method, article or equipment. In the absence of further restrictions, the elements qualified by the statement "including a . . . " do not exclude the existence of other identical elements in the process, method, article or apparatus comprising the elements.

The professional may further realize that the units and algorithm steps of each example described in conjunction with the embodiments disclosed herein may be implemented in electronic hardware, computer software, or a combination of both, in order to clearly illustrate the interchangeability of hardware and software, the composition and steps of each example have been generally described in accordance with the function in the above description. Whether these functions are performed in hardware or software depends on the specific application and design constraints of the technical solution. Professional and technical personnel may use different methods for each particular application to achieve the described function, but such implementation should not be considered beyond the scope of the present invention.

Specific examples are applied herein to elaborate the principles and embodiments of the present application, and the description of the above embodiments is only used to help understand the technical solution of the present invention and its core ideas. It should be noted that for those of ordinary skill in the art, without departing from the principles of the present invention, a number of improvements and modifications may also be made to the present invention, which also fall within the scope of protection of the claims of the present invention.

The invention claimed is:

1. A recurrent neural network accelerating system, comprising a first cache, a second cache, a vector multiplication circuit, an addition circuit, an activation circuit, a state updating circuit, a biased data cache, a vector cache and a Cell state cache, wherein, the first cache is configured to circularly switch between a first state and a second state, output $W_{x1}$ to $W_{xN}$ in N paths in the first state in parallel with degrees of parallelism of k, and output $W_{h1}$ to $W_{hN}$ in N paths in the second state in parallel with degrees of parallelism of k, wherein N is a positive integer greater than or equal to 2;

the second cache is configured to circularly switch between the first state and the second state, output $x_t$ in the first state, and output $h_{t-1}$ in the second state;

the vector multiplication circuit is configured to use N groups of multiplication arrays to respectively calculate $W_{x1}x_t$ to $W_{xN}x_t$ when receiving $W_{x1}$ to $W_{xN}$ output by the first cache, and use the N groups of multiplication arrays to respectively calculate $W_{h1}h_{t-1}$ to $W_{hN}h_{t-1}$ when receiving $W_{h1}$ to $W_{hN}$ output by the first cache, wherein the vector multiplication circuit comprises the N groups of multiplication arrays, each group of the multiplication arrays comprise k multiplication units;

the addition circuit is configured to receive $b_1$ to $b_N$ sent by a biased data cache, and use a vector cache to realize the calculation of $W_{x1}x_t+W_{h1}h_{t-1}+b_1$ to $W_{xN}x_t+W_{hN}h_{t-1}+b_N$;

the activation circuit is configured to perform activation operation according to an output of the addition circuit;

the state updating circuit is configured to obtain $c_{t-1}$ from a Cell state cache, calculate $c_t$ and $h_t$ according to the output of the activation circuit, use $c_t$ to update $c_{t-1}$ in the Cell state cache after calculating out $c_t$, and send $h_t$ to the second cache;

wherein $W_{x1}$ to $W_{xN}$ sequentially represent weight data matrixes of a first gate to a N-th gate, $W_{h1}$ to $W_{hN}$ sequentially represent hidden state weight data matrixes of the first gate to the N-th gate, $b_1$ to $b_N$ sequentially represent biased data of the first gate to the N-th gate, $x_t$ represents input data at time t, $h_{t-1}$ represents hidden state data at time t−1, $h_t$ represents hidden state data at time t, $c_t$ represents a Cell state at time t, and $c_{t-1}$ represents a Cell state at time t−1.

2. The recurrent neural network accelerating system according to claim 1, wherein the recurrent neural network is a long short-term memory network, wherein N=4, and the system comprises:

the first cache, configured to circularly switch between the first state and the second state, output $W_{xi}$, $W_{xf}$, $W_{xo}$, and $W_{xc}$ in four paths in the first state in parallel with all degrees of parallelism of k, and output $W_{hi}$, $W_{hf}$, $W_{ho}$, and $W_{hc}$ in four paths in the second state in parallel with all degrees of parallelism of k;

the second cache, configured to circularly switch between the first state and the second state, output $x_t$ in the first state, and output $h_{t-1}$ in the second state;

the vector multiplication circuit, configured to use four groups of multiplication arrays to respectively calculate $W_{xi}x_t$, $W_{xf}x_t$, $W_{xo}x_t$ and $W_{xc}x_t$ when receiving $W_{xi}$, $W_{xf}$, $W_{xo}$, and $W_{xc}$ output by the first cache, and use the four groups of multiplication arrays to respectively calculate $W_{hi}h_{t-1}$, $W_{hf}h_{t-1}$, $W_{ho}h_{t-1}$, and $W_{hc}h_{t-1}$ when receiving $W_{hi}$, $W_{hf}$, $W_{ho}$, and $W_{hc}$ output by the first cache, and comprising the four groups of multiplication arrays, wherein each group of the multiplication arrays comprise k multiplication units;

the addition circuit, configured to receive $b_i$, $b_f$, $b_o$, and $b_c$ sent by the biased data cache, and use the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$, and $W_{xc}x_t+W_{hc}h_{t-1}+b_c$, the activation circuit, configured to perform activation operation according to the output of the addition circuit, and output $i_t$, $f_t$, $o_t$, and $\tilde{c}_t$;

the state updating circuit, configured to obtain $c_{t-1}$ from the Cell state cache, calculate $c_t$ and $h_t$ according to the output of the activation circuit, use $c_t$ to update $c_{t-1}$ in the Cell state cache after calculating out $c_t$, and send $h_t$ to the second cache;

wherein $W_{xi}$, $W_{xf}$, $W_{xo}$, and $W_{xc}$ sequentially represent a weight data matrix of an input gate, a weight data matrix of a forget gate, a weight data matrix of an output gate, and a weight data matrix of a Cell gate, $W_{hi}$, $W_{hf}$, $W_{ho}$, and $W_{hc}$ sequentially represent a hidden state weight data matrix of the input gate, a hidden state weight data matrix of the forget gate, a hidden state weight data matrix of the output gate, and a hidden state weight data matrix of the Cell gate, $b_i$, $b_f$, $b_o$, and $b_c$ sequentially represent biased data of the input gate, biased data of the forget gate, biased data of the output gate, and biased data of the Cell gate, $i_t$, $f_t$, $o_t$, and $\tilde{c}_t$ sequentially represent the input gate, the forget gate, the output gate, and the Cell gate, $x_t$ represents input data at time t, $h_{t-1}$ represents hidden state data at time t−1, $h_t$ represents hidden state data at time t, $c_t$ represents the Cell state at time t, and $c_{t-1}$ represents the Cell state at time t−1.

3. The recurrent neural network accelerating system according to claim 2, wherein the vector multiplication circuit is in a first flow line, the addition circuit is in a second flow line, the activation circuit and the state updating circuit are in a third flow line, and the first flow line, the second flow line and the third flow line run in parallel.

4. The recurrent neural network accelerating system according to claim 2, wherein the first cache comprises a first storage unit, a second storage unit, a first multiplexer, a first memory, a second memory, a third memory and a fourth memory and a data classifier, wherein, the first storage unit is configured to obtain a target number of $W_{xi}$, a target number of $W_{xf}$, a target number of $W_{xo}$, and a target number of $W_{xc}$ from an off-chip storage;

the second storage unit is configured to obtain a target number of $W_{hi}$, a target number of $W_{hf}$, a target number of $W_{ho}$, and a target number of $W_{hc}$ from the off-chip storage;

the first multiplexer is connected to the first storage unit and the second storage unit respectively, configured to realize the circular switching between the first state and the second state, and select the first storage unit for data output in the first state, and select the second storage unit for data output in the second state;

the first memory, the second memory, the third memory and the fourth memory are all connected to the first multiplexer through a data classifier, and configured to output $W_{xi}$, $W_{xf}$, $W_{xo}$, and $W_{xc}$ sequentially in parallel with all degrees of parallelism of k when the first multiplexer is in the first state, and configured to output $W_{hi}$, $W_{hf}$, $W_{ho}$, and $W_{hc}$ sequentially in parallel with all degrees of parallelism of k when the first multiplexer is in the second state;

wherein the target number is greater than k.

5. The recurrent neural network accelerating system according to claim 4, wherein the first storage unit and the second storage unit both adopt a first clock, the first memory, the second memory, the third memory and the fourth memory all adopt a second clock, and the first clock and the second clock are independent of each other, so that when the output rate of any one of the first memory, the second memory, the third memory and the fourth memory is lower than the input rate, unsent data is cached in the memory.

6. The recurrent neural network accelerating system according to claim 4, wherein the first memory, the second memory, the third memory, and the fourth memory are all first-in-first-out (FIFO) memories.

7. The recurrent neural network accelerating system according to claim 4, wherein the first storage unit and the second storage unit are block RAMs.

8. The recurrent neural network accelerating system according to claim 4, wherein the first storage unit and the second storage unit form a ping-pong structure.

9. The recurrent neural network accelerating system according to claim 2, wherein the second cache comprises:

a third storage unit, configured to obtain $x_t$ at odd time from the off-chip storage;

a fourth storage unit, configured to obtain $x_t$ at even time from the off-chip storage;

a second multiplexer, connected to the third storage unit and the fourth storage unit respectively, configured to realize the circular switching between the first state and the second state, select the third storage unit for data output in the first state, and select the fourth storage unit for data output in the second state;

a third multiplexer, configured to obtain $h_0$ from the off-chip storage, receive $h_t$ sent by the state updating circuit, and select $h_0$ only at the first selection, wherein $h_0$ represents hidden state data at time t=1;

a fifth storage unit, configured to obtain $h_t$ and $h_0$ at even time through the third multiplexer;

a sixth storage unit, configured to obtain $h_t$ at odd time through the third multiplexer;

a fourth multiplexer, configured to realize the circular switching between the first state and the second state, select the fifth storage unit for data output in the first state, and select the sixth storage unit for data output in the second state; and a fifth multiplexer, configured to realize the circular switching between the first state and the second state, select the second multiplexer for data output in the first state, and select the fourth multiplexer for data output in the second state.

10. The recurrent neural network accelerating system according to claim 9, wherein the third storage unit and the fourth storage unit form a ping-pong structure, and the fifth storage unit and the sixth storage unit form a ping-pong structure.

11. The recurrent neural network accelerating system according to claim 2, wherein the addition circuit comprises:

four groups of $\log_2$ k-level adder circuits, wherein each group of $\log_2$ k-level adder circuits are configured to sum k of input data; and a vector addition circuit, connected to outputs of the four groups of adder circuits, configured to receive $b_i$, $b_f$, $b_o$, and $b_c$ sent by the biased data cache, and use the vector cache to realize the calculation of $W_{xi}x_t+W_{hi}h_{t-1}+b_i$, $W_{xf}x_t+W_{hf}h_{t-1}+b_f$, $W_{xo}x_t+W_{ho}h_{t-1}+b_o$ and $W_{xc}x_t+W_{hc}h_{t-1}+b_c$ according to the output of each group of the adder circuits.

12. The recurrent neural network accelerating system according to claim 2, wherein the activation circuit is configured to:
perform sigmoid activation operation and tanh activation operation according to the output of the addition circuit, and output $i_t$, $f_t$, $o_t$ and $\tilde{c}_t$.

13. The recurrent neural network accelerating system according to claim 2, wherein the state updating circuit is configured to:
obtain $c_{t-1}$ from the Cell state cache, calculate $c_t$ and $h_t$ according to the output of the activation circuit, use $c_t$ to update $c_{t-1}$ in the Cell state cache after calculating out $c_t$, and send $h_t$ to the second cache, wherein $c_t = f_t * c_{t-1} + i_t * \tilde{c}_t$; $h_t = o_t \odot \tanh(c_t)$; $\odot$ represents point multiplication.

14. The recurrent neural network accelerating system according to claim 2, wherein the recurrent neural network is a gate recurrent unit (GRU) network, and N equals to 2.

15. A recurrent neural network accelerating method, being applied to the recurrent neural network accelerating system according to claim 1, and comprising the following steps:
the first cache circularly switches between the first state and the second state, outputs $W_{x1}$ to $W_{xN}$ in N paths in the first state in parallel with degrees of parallelism of k, and outputs $W_{h1}$ to $W_{hN}$ in N paths in the second state in parallel with degrees of parallelism of k, wherein N is a positive integer greater than or equal to 2;
the second cache circularly switches between the first state and the second state, outputs $x_t$ in the first state, and outputs $h_{t-1}$ in the second state;
the vector multiplication circuit uses the N groups of multiplication arrays to respectively calculate $W_{x1}x_t$ to $W_{xN}x_t$ when receiving $W_{x1}$ to $W_{xN}$ output by the first cache, uses the N groups of multiplication arrays to respectively calculate $W_{h1}h_{t-1}$ to $W_{hN}h_{t-1}$ when receiving $W_{h1}$ to $W_{hN}$ output by the first cache, and the vector multiplication circuit comprises the N groups of multiplication arrays, wherein each group of the multiplication arrays comprise k multiplication units;
the addition circuit receives $b_1$ to $b_N$ sent by the biased data cache, and uses the vector cache to realize the calculation of $W_{x1}x_t + W_{h1}h_{t-1} + b_1$ and $W_{xN}x_t + W_{hN}h_{t-1} + b_N$;
the activation circuit performs activation operation according to the output of the addition circuit;
the state updating circuit obtains $c_{t-1}$ from the Cell state cache, calculates $c_t$ and $h_t$ according to the output of the activation circuit, uses $c_t$ to update $c_{t-1}$ in the Cell state cache after calculating out $c_t$, and sends $h_t$ to the second cache;
wherein $W_{x1}$ to $W_{xN}$ sequentially represent weight data matrixes of the first gate to the N-th gate, $W_{h1}$ to $W_{hN}$ sequentially represent hidden state weight data matrixes of the first gate to the N-th gate, $b_1$ to $b_N$ sequentially represent biased data of the first gate to the N-th gate, $x_t$ represents input data at time t, $h_{t-1}$ represents hidden state data at time t−1, $h_t$ represents hidden state data at time t, $c_t$ represents a Cell state at time t, and $c_{t-1}$ represents a Cell state at time t−1.

16. The recurrent neural network accelerating method according to claim 15, wherein the RNN is the LSTM, and N=4,
the step of the first cache circularly switches between the first state and the second state, outputs $W_{x1}$ to $W_{xN}$ in paths in the first state in parallel with degrees of parallelism of k, and outputs $W_{h1}$ to $W_{hN}$ in N paths in the second state in parallel with degrees of parallelism of k comprises: the first cache circularly switches between the first state and the second state, outputs $W_{xi}$, $W_{xf}$, $W_{xo}$, and $W_{xc}$ in four paths in the first state in parallel with all degrees of parallelism of k, and outputs $W_{hi}$, $W_{hf}$, $W_{ho}$, and $W_{hc}$ in four paths in the second state in parallel with all degrees of parallelism of k;
the step of the second cache circularly switches between the first state and the second state, outputs $x_t$ in the first state, and outputs $h_{t-1}$ in the second state comprises: the second cache circularly switches between the first state and the second state, outputs $x_t$ in the first state, and outputs $h_{t-1}$ in the second state;
the step of the vector multiplication circuit uses the N groups of multiplication arrays to respectively calculate $W_{x1}x_t$ to $W_{xN}x_t$ when receiving $W_{x1}$ to $W_{xN}$ output by the first cache, uses the N groups of multiplication arrays to respectively calculate $W_{h1}h_{t-1}$ to $W_{hN}h_{t-1}$ when receiving $W_{h1}$ to $W_{hN}$ output by the first cache comprises: the vector multiplication circuit uses four groups of multiplication arrays to respectively calculate $W_{xi}x_t$, $W_{xf}x_t$, $W_{xo}x_t$ and $W_{xc}x_t$ when receiving $W_{xi}$, $W_{xf}$, $W_{xo}$, and $W_{xc}$ output by the first cache, and uses the four groups of multiplication arrays to respectively calculate $W_{hi}h_{t-1}$, $W_{hf}h_{t-1}$, $W_{ho}h_{t-1}$, and $W_{hc}h_{t-1}$ when receiving $W_{hi}$, $W_{hf}$, $W_{ho}$, and $W_{hc}$ output by the first cache, and includes the four groups of multiplication arrays, wherein each group of multiplication arrays include k multiplication units;
the step of the addition circuit receives $b_1$ to $b_N$ sent by the biased data cache, and uses the vector cache to realize the calculation of $W_{x1}x_t + W_{h1}h_{t-1} + b_1$ and $W_{xN}x_t + W_{hN}h_{t-1} + b_N$ comprises: the addition circuit receives $b_i$, $b_f$, $b_o$, and $b_c$ sent by the biased data cache, and uses the vector cache to realize the calculation of $W_{xi}x_t + W_{hi}h_{t-1} + b_i$, $W_{xf}x_t + W_{hf}h_{t-1} + b_f$, $W_{xo}x_t + W_{ho}h_{t-1} + b_o$, and $W_{xc}x_t + W_{hc}h_{t-1} + b_c$;
the step of the activation circuit performs activation operation according to the output of the addition circuit comprises: the activation circuit performs activation operation according to the output of the addition circuit, and output $i_t$, $f_t$, $o_t$, and $\tilde{c}_t$;
the step of the state updating circuit obtains $c_{t-1}$ from the Cell state cache, calculates $c_t$ and $h_t$ according to the output of the activation circuit, uses $c_t$ to update $c_{t-1}$ in the Cell state cache after calculating out $c_t$, and sends $h_t$ to the second cache comprises: the state updating circuit obtains $c_{t-1}$ from the Cell state cache 90, calculates $c_t$ and $h_t$ according to the output of the activation circuit, uses $c_t$ to update $c_{t-1}$ in the Cell state cache after calculating out $c_t$, and sends $h_t$ to the second cache;
wherein $W_{xi}$, $W_{xf}$, $W_{xo}$, and $W_{xc}$ sequentially represent the weight data matrix of the input gate, the weight data matrix of the forget gate, the weight data matrix of the output gate, and the weight data matrix of the Cell gate; $W_{hi}$, $W_{hf}$, $W_{ho}$, and $W_{hc}$ sequentially represent the hidden state weight data matrix of the input gate, the hidden state weight data matrix of the forget gate, the hidden state weight data matrix of the output gate, and the hidden state weight data matrix of the Cell gate; $b_i$, $b_f$, $b_o$, and $b_c$ sequentially represent biased data of the input gate, biased data of the forget data, biased data of the output gate, and biased data of the Cell gate; $i_t$, $f_t$, $o_t$, and $\tilde{c}_t$ sequentially represent the input gate, the forget gate, the output gate and the Cell data; $x_t$ represents input data at time t; $h_{t-1}$ represents hidden state data at time t−1; $h_t$ represents hidden state data at time t; $c_t$ represents the Cell state at time t; and $c_{t-1}$ represents the Cell state at time t−1.

17. The recurrent neural network accelerating method according to claim 16, wherein the vector multiplication circuit is in a first flow line, the addition circuit is in a second flow line, the activation circuit and the state updating circuit are in a third flow line, and the first flow line, the second flow line and the third flow line run in parallel.

18. The recurrent neural network accelerating method according to claim 16, wherein the first cache comprises a first storage unit, a second storage unit, a first multiplexer, a first memory, a second memory, a third memory and a fourth memory and a data classifier, wherein,
the first storage unit is configured to obtain a target number of $W_{xi}$, a target number of $W_{xf}$, a target number of $W_{xo}$, and a target number of $W_{xc}$ from an off-chip storage;
the second storage unit is configured to obtain a target number of $W_{hi}$, a target number of $W_{hf}$, a target number of $W_{ho}$, and a target number of $W_{hc}$ from the off-chip storage;
the first multiplexer is connected to the first storage unit and the second storage unit respectively, configured to realize the circular switching between the first state and the second state, and select the first storage unit for data output in the first state, and select the second storage unit for data output in the second state;
the first memory, the second memory, the third memory and the fourth memory are all connected to the first multiplexer through a data classifier, and configured to output $W_{xi}$, $W_{xf}$, $W_{xo}$, and $W_{xc}$ sequentially in parallel with all degrees of parallelism of k when the first multiplexer is in the first state, and configured to output $W_{hi}$, $W_{hf}$, $W_{ho}$, and $W_{hc}$ sequentially in parallel with all degrees of parallelism of k when the first multiplexer is in the second state;
wherein the target number is greater than k.

19. The recurrent neural network accelerating system according to claim 1, wherein k is an integer multiple of 2.

20. A computer readable storage medium, storing a computer program, wherein when being executed by a processor, the computer program realizes the steps of the recurrent neural network accelerating method comprising:
a first cache circularly switching between a first state and a second state, outputting $W_{x1}$ to $W_{xN}$ in N paths in the first state in parallel with degrees of parallelism of k, and outputting $W_{h1}$ to $W_{hN}$ in N paths in the second state in parallel with degrees of parallelism of k, wherein N is a positive integer greater than or equal to 2;
a second cache circularly switching between the first state and the second state, outputting $x_t$ in the first state, and output $h_{t-1}$ in the second state;
a vector multiplication circuit using N groups of multiplication arrays to respectively calculate $W_{x1}x_t$ to $W_{xN}x_t$ when receiving $W_{x1}$ to $W_{xN}$ output by the first cache, and using the N groups of multiplication arrays to respectively calculate $W_{h1}h_{t-1}$ to $W_{hN}h_{t-1}$ when receiving $W_{h1}$ to $W_{hN}$ output by the first cache, wherein the vector multiplication circuit comprises the N groups of multiplication arrays, each group of the multiplication arrays comprise k multiplication units;
an addition circuit receiving $b_1$ to $b_N$ sent by a biased data cache, and using a vector cache to realize the calculation of $W_{x1}x_t+W_{h1}h_{t-1}+b_1$ to $W_{xN}x_t+W_{hN}h_{t-1}+b_N$;
an activation circuit performing activation operation according to an output of the addition circuit;
a state updating circuit obtaining $c_{t-1}$ from a Cell state cache, calculating $c_t$ and $h_t$ according to the output of the activation circuit, use $c_t$ to update $c_{t-1}$ in the Cell state cache after calculating out $c_t$, and send $h_t$ to the second cache;
wherein $W_{x1}$ to $W_{xN}$ sequentially represent weight data matrixes of a first gate to a N-th gate, $W_{h1}$ to $W_{hN}$ sequentially represent hidden state weight data matrixes of the first gate to the N-th gate, $b_1$ to $b_N$ sequentially represent biased data of the first gate to the N-th gate, $x_t$ represents input data at time t, $h_{t-1}$ represents hidden state data at time t−1, $h_t$ represents hidden state data at time t, $c_t$ represents a Cell state at time t, and $c_{t-1}$ represents a Cell state at time t−1.

\* \* \* \* \*